(12) United States Patent
Mizuno et al.

(10) Patent No.: US 9,885,578 B2
(45) Date of Patent: Feb. 6, 2018

(54) CURVE-SHAPE MODELING DEVICE, VEHICLE INFORMATION PROCESSING SYSTEM, CURVE-SHAPE MODELING METHOD, AND NON-TRANSITORY TANGIBLE COMPUTER READABLE MEDIUM FOR THE SAME

(71) Applicant: DENSO CORPORATION, Kariya, Aichi-pref. (JP)

(72) Inventors: Nobuhiro Mizuno, Ichihara (JP); Masahiro Iida, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 108 days.

(21) Appl. No.: 14/783,959

(22) PCT Filed: Mar. 21, 2014

(86) PCT No.: PCT/JP2014/001665
§ 371 (c)(1),
(2) Date: Oct. 12, 2015

(87) PCT Pub. No.: WO2014/171073
PCT Pub. Date: Oct. 23, 2014

(65) Prior Publication Data
US 2016/0054133 A1    Feb. 25, 2016

(30) Foreign Application Priority Data
Apr. 19, 2013    (JP) .................................. 2013-088290

(51) Int. Cl.
*G01C 21/00*    (2006.01)
*G01C 21/20*    (2006.01)
(Continued)

(52) U.S. Cl.
CPC ............. *G01C 21/20* (2013.01); *G01C 21/32* (2013.01); *G09B 29/00* (2013.01)

(58) Field of Classification Search
CPC .......... G01C 21/20; G01C 21/32; G09B 29/00
See application file for complete search history.

(56) References Cited

U.S. PATENT DOCUMENTS 4,727,492 A * 2/1988 Reeve .................... G05D 1/024
                                                                180/169
5,978,731 A * 11/1999 Matsuda ............ B60K 31/0058
                                                                180/179

(Continued)

FOREIGN PATENT DOCUMENTS

JP    H08194892 A    7/1996
JP    H09185322 A    7/1997

(Continued)

OTHER PUBLICATIONS

International Search Report and Written Opinion (in Japanese with English Translation) for PCT/JP2014/001665, dated Jun. 10, 2014; ISA/JP.

(Continued)

*Primary Examiner* — Ian Jen
(74) *Attorney, Agent, or Firm* — Harness, Dickey & Pierce, P.L.C.

(57) ABSTRACT

A curve-shape modeling device that divides multiple sampling points along a route into a linear section, a relaxation curve section and a steady section, and models a curve shape of the route, includes: a curve extraction unit that extracts a curve from the sampling points based on a curvature of the sampling points; a steady section curvature determination unit that determines a curvature of the steady section based on a curvature of sampling points included in an extracted curve; and a curve entry and exit determination unit that sets a predetermined curvature range including the curvature of (Continued)

the steady section, and determines a start point and an end point of the steady section based on the curvature range.

15 Claims, 16 Drawing Sheets

(51) Int. Cl.
*G01C 21/32* (2006.01)
*G09B 29/00* (2006.01)

(56) References Cited

U.S. PATENT DOCUMENTS

| | | | | |
|---|---|---|---|---|
| 6,141,619 A * | 10/2000 | Sekine | ............... | B60K 31/0058 340/990 |
| 6,208,927 B1 * | 3/2001 | Mine | ................. | B60K 31/0058 701/70 |
| 6,385,528 B1 * | 5/2002 | Takahashi | .......... | B60K 31/0066 701/70 |
| 6,392,535 B1 * | 5/2002 | Matsuno | ................. | B60Q 9/00 340/425.5 |
| 6,424,904 B1 * | 7/2002 | Takahashi | .......... | B60K 31/0083 340/441 |
| 6,778,896 B1 * | 8/2004 | Matsuura | ........... | B60K 31/0066 701/70 |
| 7,084,882 B1 * | 8/2006 | Dorum | ................... | G01C 21/32 345/589 |
| 7,778,758 B2 * | 8/2010 | Tsuchiya | ............ | B60K 31/0066 382/104 |
| 7,792,624 B2 * | 9/2010 | Nakamura | ................ | B60T 7/22 340/437 |
| 8,024,099 B2 * | 9/2011 | Suzuki | ............... | B60K 31/0066 303/140 |
| 8,150,591 B2 * | 4/2012 | Isaji | ................... | B60W 30/146 340/425.5 |
| 8,170,769 B2 * | 5/2012 | Tsuchiya | ............ | B60K 31/0075 701/70 |
| 8,265,847 B2 * | 9/2012 | Miyajima | .......... | B60K 31/0066 701/72 |
| 8,606,498 B2 * | 12/2013 | Pesterev | ................ | G01C 21/16 701/400 |
| 8,892,329 B2 * | 11/2014 | Yasui | ................... | B60W 30/146 701/72 |
| 9,168,946 B2 * | 10/2015 | Ashjaee | ............... | A01B 69/008 |
| 9,244,462 B2 * | 1/2016 | Pedersen | ............... | G05D 1/0088 |
| 2001/0037173 A1 * | 11/2001 | Sekine | ................... | G01C 21/34 701/410 |
| 2002/0161510 A1 | 10/2002 | Matsuura | | |
| 2007/0208485 A1 * | 9/2007 | Yamamura | ......... | B60K 31/0066 701/93 |
| 2008/0255728 A1 * | 10/2008 | Ottenhues | .......... | B62D 15/0285 701/41 |
| 2009/0157260 A1 * | 6/2009 | Lee | .................... | B62D 15/0285 701/41 |
| 2010/0082203 A1 * | 4/2010 | Isaji | ...................... | B60W 30/09 701/41 |
| 2010/0082216 A1 * | 4/2010 | Yasui | .................. | B60K 31/0066 701/93 |
| 2011/0046877 A1 * | 2/2011 | Hoffmann | .......... | G01C 21/3461 701/467 |
| 2011/0178689 A1 * | 7/2011 | Yasui | ....................... | B60T 7/12 701/70 |
| 2011/0218724 A1 * | 9/2011 | Iida | ........................ | G01C 21/32 701/70 |
| 2012/0150411 A1 * | 6/2012 | Oosawa | .................. | B60K 31/008 701/96 |
| 2012/0209489 A1 * | 8/2012 | Saito | ....................... | B60T 7/042 701/70 |
| 2012/0239287 A1 * | 9/2012 | Pieper | ................... | G05D 1/0212 701/400 |
| 2013/0006473 A1 * | 1/2013 | Buerkle | ............... | B60W 30/045 701/41 |
| 2013/0080019 A1 * | 3/2013 | Isaji | ....................... | B60W 30/16 701/96 |
| 2014/0012469 A1 * | 1/2014 | Kunihiro | ............. | B60W 40/072 701/41 |

FOREIGN PATENT DOCUMENTS

| | | |
|---|---|---|
| JP | 2002329299 A | 11/2002 |
| JP | 2007192582 A | 8/2007 |
| JP | 2013015735 A | 1/2013 |

OTHER PUBLICATIONS

Koji Makanae, "The Geometric Path Model for the Support of Automated Vehicles", ITS Japan 2003, Dec. 6 to 8, 2003.

* cited by examiner

CURVE-SHAPE MODELING DEVICE, VEHICLE INFORMATION PROCESSING SYSTEM, CURVE-SHAPE MODELING METHOD, AND NON-TRANSITORY TANGIBLE COMPUTER READABLE MEDIUM FOR THE SAME

CROSS REFERENCE TO RELATED APPLICATIONS

This application is a U.S. National Phase Application under 35 U.S.C. 371 of International Application No. PCT/JP2014/001665 filed on Mar. 21, 2014 and published in Japanese as WO 2014/171073 A1 on Oct. 23, 2014. This application is based on and claims the benefit of priority from Japanese Patent Application No. 2013-088290 filed on Apr. 19, 2013. The entire disclosures of all of the above applications are incorporated herein by reference.

TECHNICAL FIELD

The present disclosure relates to a curve-shape modeling device, a curve-shape modeling method, a curve-shape modeling program, and a vehicle information processing system to model a curve shape from actual travel data or map data.

BACKGROUND ART

There is proposed a system that controls an automobile to travel a road and provides driving support for a driver of the automobile to travel the road based on a shape of the road to be traveled. The system requires acquiring accurate information about the road shape. For example, accurate information about a curve shape is required when an automobile is going to travel a tight curve and a driver needs to change a vehicle speed as appropriately as possible according to a natural feeling.

A navigation system includes map data as database. The navigation system uses a GPS receiver to detect a position of the traveling vehicle and compares the detected position information with the map data to specify the vehicle position on the map. To generate the map data used for the navigation system, a commercially available road map is used to sample points on a road at regular intervals to extract node points. Two-dimensional coordinate information about the nodes is stored in a storage.

However, presently available maps for car navigation systems aim at route search and route guidance to destinations. These maps are not so accurate as to control the vehicle travel or support the driver in driving.

There are proposed map generation devices to generate map data based on a route the vehicle actually traveled (e.g., see patent literatures 1 and 2).

However, an actual vehicular swept path does not indicate a steady section (a regular-curvature section) existent on a constructed road even if the map generation device according to the prior art is used to generate map data. A steady section length cannot be digitized accurately. A vehicle speed cannot be controlled appropriately in relation to a curve.

PRIOR ART LITERATURES

Patent Literature

Patent Literature 1: JP-H9-185322 A
Patent Literature 2: JP-2013-015735 A

SUMMARY OF INVENTION

It is an object of the present disclosure to provide a curve-shape modeling device, a curve-shape modeling method, a curve-shape modeling program, and a vehicle information processing system for accurately extracting a road shape.

According to a first aspect of the disclosure, a curve-shape modeling device that divides a plurality of sampling points acquired along a route into a linear section, a relaxation curve section and a steady section, and models a curve shape of the route, includes: a curve extraction unit that extracts a curve from the sampling points based on a curvature of the sampling points; a steady section curvature determination unit that determines a curvature of the steady section based on a curvature of sampling points included in the curve extracted by the curve extraction unit; and a curve entry and exit determination unit that sets a predetermined curvature range including the curvature of the steady section, and determines a start point and an end point of the steady section based on the curvature range.

The above curve-shape modeling device extracts the curve from the sampling points, determines the curvature (i.e., the steady section curvature) of the curve, and determines the steady section based on a predetermined curvature range including the curvature. This can prevent the steady section from being shortened excessively, and accurately model the curve shape.

According to a second aspect of the present disclosure, a vehicle information processing system processes information about a vehicle based on detected vehicle information and a route modeled by the curve-shape modeling device according to the first aspect of the present disclosure.

The above vehicle information processing system can perform information processing such as driving support and driving control based on an accurately modeled curve shape.

According to a third aspect of the present disclosure, a curve-shape modeling method of classifying a plurality of sampling points acquired along a route into a linear section, a relaxation curve section and a steady section to model a curve shape of the route, includes: extracting a curve from the sampling points based on a curvature at the sampling points; determining a curvature of the steady section based on a curvature at the sampling points included in an extracted curve; and setting a predetermined curvature range including the curvature of the steady section, and determining a start point and an end point of the steady section based on the curvature range.

The above curve-shape modeling method extracts the curve from the sampling points, determines the curvature (i.e., the steady section curvature) of the curve, and determines the steady section based on a predetermined curvature range including the curvature. This can prevent the steady section from being shortened excessively, and accurately model the curve shape.

According to a fourth aspect of the present disclosure, a curve-shape modeling program controls a computer to perform a curve-shape modeling method of classifying a plurality of sampling points acquired along a route into a linear section, a relaxation curve section and a steady section to model a curve shape of the route. The method includes: extracting a curve from the sampling points based on a curvature at the sampling points; determining a curvature of the steady section based on a curvature at the sampling points included in a curve extracted at the extracting of the curve; and setting a predetermined curvature range including the curvature of the steady section, and determining a start point and an end point of the steady section based on the curvature range.

The above curve-shape modeling program extracts the curve from the sampling points, determines the curvature (i.e., the steady section curvature) of the curve, and determines the steady section based on a predetermined curvature range including the curvature. This can prevent the steady section from being shortened excessively, and accurately model the curve shape.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

Figure 1A:
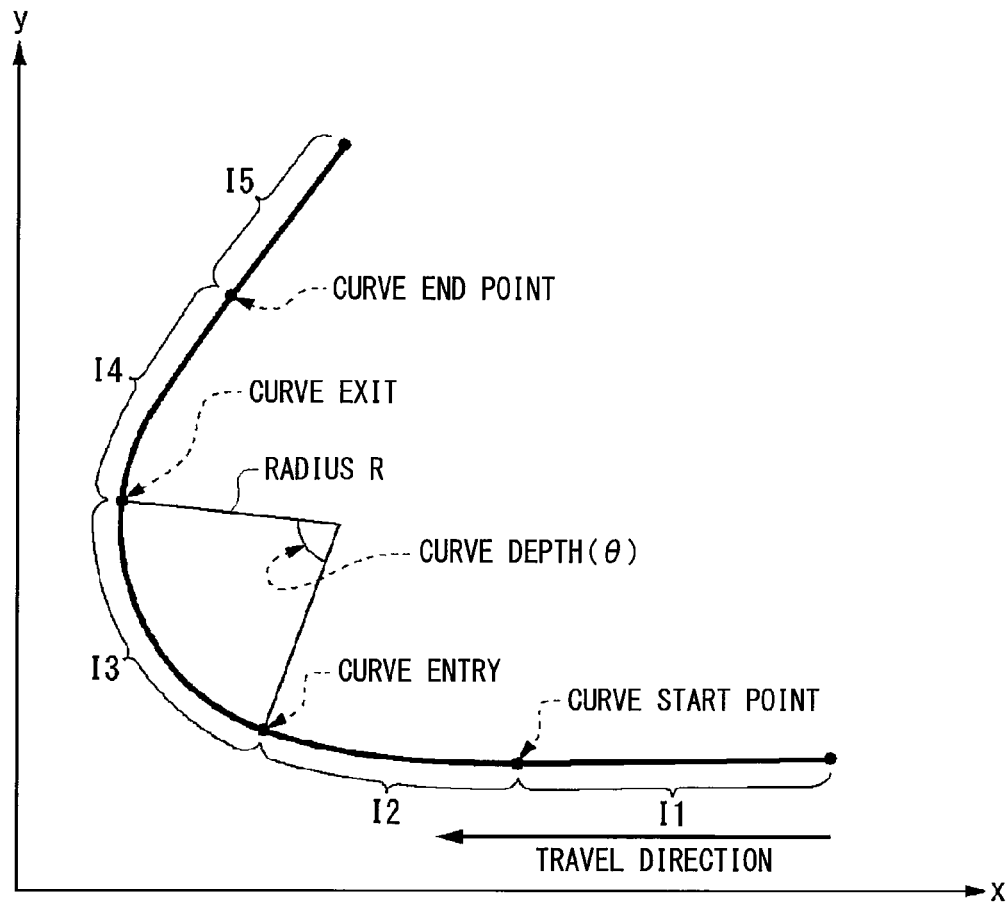
FIG. 1A is a diagram illustrating a vehicular swept path based on an X-Y coordinate (latitude and longitude) according to an embodiment of the disclosure.
Figure 1B:
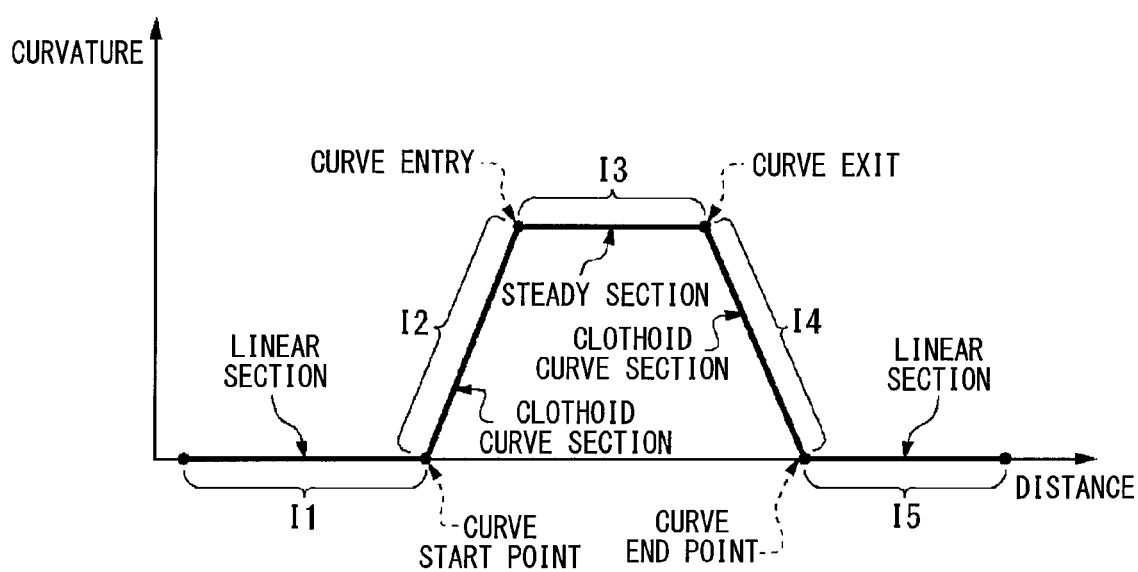
FIG. 1B is a graph illustrating a change in the curvature of the vehicular swept path.

Preferred embodiments of the present disclosure will be described with reference to the accompanying drawings. Technical terms used for the description will be defined. FIG. 1A is a diagram illustrating a vehicular swept path. FIG. 1B is a graph illustrating a change in the curvature of the vehicular swept path in FIG. 1A.

FIG. 1A illustrates the vehicular swept path based on an X-Y coordinate (latitude and longitude). As illustrated in FIG. 1A, a vehicle is assumed to travel sections I1, I2, I3, I4, and I5 in this order. As illustrated in FIG. 1B, the curvature of the vehicular swept path is zero in section I1. The curvature gradually increases in section I2. The curvature maintains a given value in section I3. The curvature decreases to zero in section I4. The curvature remains zero in section I5.

Sections I1 and I5 keep the curvature zero and are defined as a linear section. Section I2 gradually increases the curvature and is defined as a clothoid curve section. Section I3 keeps the curvature constant and is defined as a steady section (or a circular section). Section I4 gradually decreases the curvature and is defined as the clothoid curve section.

Linear section I1 changes to clothoid curve section I2 at a curve start point. Clothoid curve section I2 gradually increases the curvature. Clothoid curve section I2 changes to steady section I3 at a curve entry. Clothoid curve section I2 gradually increases the curvature. Steady section I3 changes to clothoid curve section I4 at a curve exit. Clothoid curve section I4 gradually decreases the curvature. Clothoid curve section I4 changes to linear section I5 at a curve endpoint. Clothoid curve section I4 gradually decreases the curvature. The steady section forms an angle defined as a curve depth with reference to a curvature center (reference point). The curve depth represents the length of the steady section.

Figure 2:
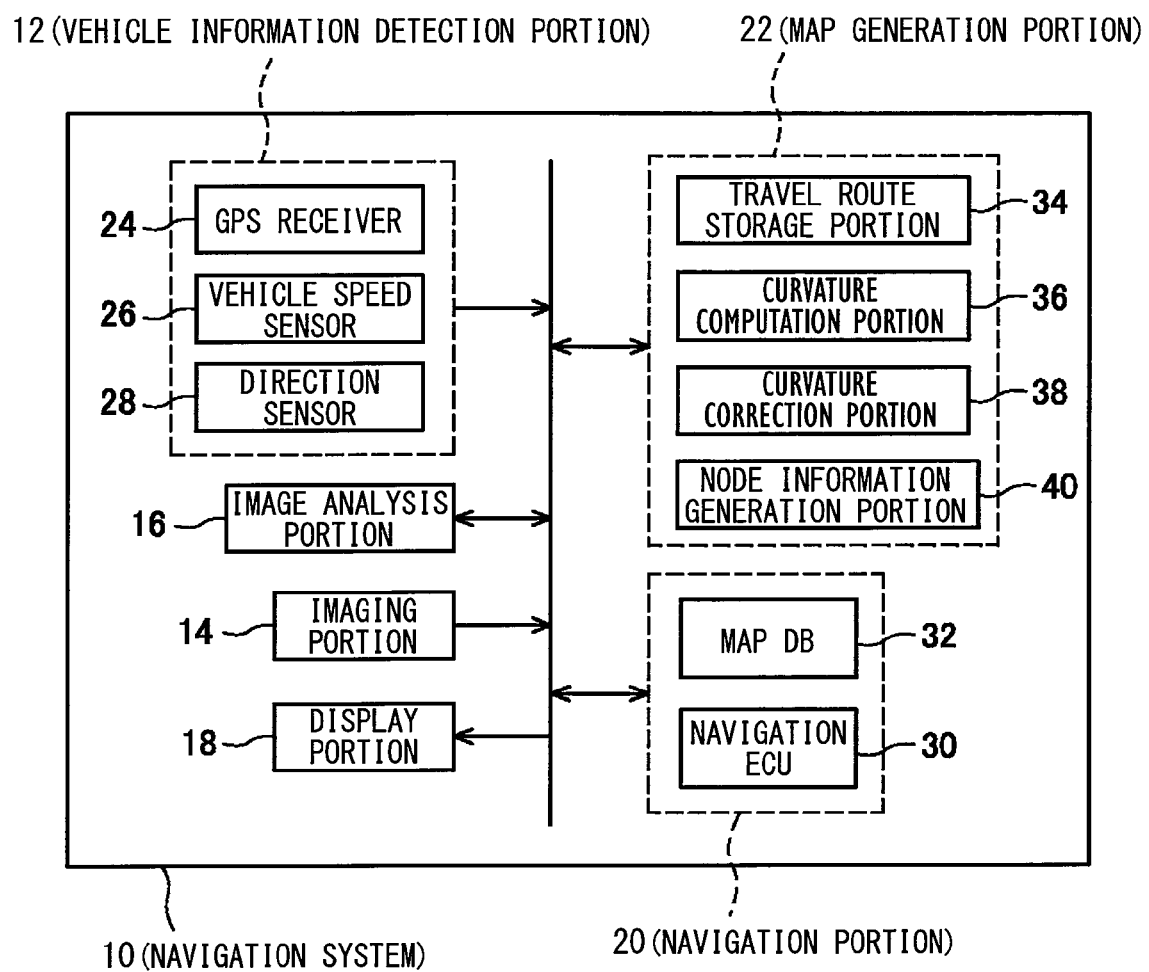
FIG. 2 is a block diagram illustrating a configuration of a navigation system using a curve-shape modeling device according to the embodiment of the disclosure.

FIG. 2 is a block diagram illustrating a configuration of a vehicular navigation system including a curve-shape modeling device according to the embodiment of the disclosure. A navigation system 10 includes a vehicle information detection portion 12, an imaging portion 14, an image analysis portion 16, a display portion 18, a navigation portion 20, and a map generation portion 22. The map generation portion 22 models a curve shape to generate a map. The map generation portion 22 corresponds to a curve-shape modeling device and a map generation device.

The vehicle information detection portion 12 includes a GPS receiver 24, a vehicle speed sensor 26, and a direction sensor 28, for example. The GPS receiver 24 receives a radio signal from a GPS satellite to acquire position information (latitude and longitude information) of the vehicle. The vehicle speed sensor 26 measures a travel seed of the vehicle to acquire travel speed information. The direction sensor 28 provides a geomagnetic sensor or a gyro sensor and acquires travel direction information indicating the absolute orientation along which the vehicle travels.

The vehicle information detection portion 12 can include an acceleration sensor, an accelerator opening sensor, a brake sensor, and a steering sensor in addition to the above-mentioned sensors. The acceleration sensor detects a vehicle acceleration. The accelerator opening sensor detects an accelerator opening. The brake sensor detects the amount of brake pedal manipulation. The steering sensor detects a steering angle.

The imaging portion 14 may provide a CCD or CMOS camera attached near a windshield of the vehicle. The imaging portion 14 can use a camera provided for a commercially available drive recorder. The imaging portion 14 captures a situation ahead of the vehicle to generate a captured image. The imaging portion 14 applies a signal process such as white balance or gamma correction to the captured image and output captured image data.

The image analysis portion 16 applies known image analysis to an image acquired by the imaging portion 14. The image analysis portion 16 compares the image with data indicating feature quantities of previously store facilities (e.g., road sign, signal, gas station, convenience store, and hotel) and thereby detects the presence or absence of a facility near the currently traveled road and a facility type.

The display portion 18 may provide a liquid crystal display. A map image is generated from map data stored in a map DB 32 to be described. The display portion 18 displays the map image overlaid with an indicator that marks the vehicle position. The display portion 18 thereby provides a driver with map information. When an input portion (unshown) supplies destination information, the display portion 18 also displays information about a route to the destination.

The navigation portion 20 includes a navigation ECU 30 and a map database (map DB) 32. The navigation ECU 30 generates route information to implement a navigation function. The map DB 32 stores map information. The navigation ECU 30 allows the display portion 18 to display a map image overlaid with information about a route to the user-specified destination. The navigation ECU 30 also allows the display portion 18 to display the map image overlaid with the current vehicle position based on information such as the vehicle position, speed, and travel direction detected in the vehicle information detection portion 12.

The map DB 32 stores information such as facility data and node data needed to configure a road map. The node data concerns the position and the shape of a road included in the map image. The node data contains coordinates (latitude and longitude) of a point (node point) on a road containing a road branch point (intersection), the classification of a road (e.g., express highway, arterial road, and city road) containing the node point, the type of a road (linear section, circular section, or clothoid curve section) at the node point, and the curvature of the road. The facility data contains data about a facility near each node point and is stored in association with the node data.

The navigation ECU 30 supplies a driver with an instruction about acceleration, braking, or steering to provide the driving support using information such as the node data stored in the map DB 32 based on the information such as the vehicle position, speed, and travel direction detected in the vehicle information detection portion 12. The embodiment accurately acquires the road type (linear section, circular section, or clothoid curve section) at the node point and accurately models a curve shape. The embodiment can appropriately provide the driving support.

Information such as the node data stored in the map DB 32 and information such as the vehicle position, speed, and travel direction detected in the vehicle information detection portion 12 may be used to control the vehicle driving (such as automatic acceleration, automatic braking, and automatic steering). Also in this case, the driving control can be appropriately provided because a curve shape is accurately modeled. A system to process information including the driving control and the driving support corresponds to the vehicle information processing system according to the disclosure.

The map generation portion 22 generates a road map based on the route traveled by the vehicle. The map generation portion 22 includes a travel route storage portion 34, a curvature computation portion 36, a curvature correction portion 38, and a node information generation portion 40. The map DB 32 of the navigation portion 20 sequentially stores road map data (node data) generated in the map generation portion 22.

The travel route storage portion 34 sequentially stores the vehicle position information (latitude and longitude) detected by the vehicle information detection portion 12 at a specified time interval. The vehicle information detection portion 12 detects the position information at a point referred to as a sampling point. The position information received by the GPS receiver 26 may be used as the position information at the sampling point. The position information about the sampling point may be corrected in combination with the vehicle speed information detected by the vehicle speed sensor 28 and the travel direction information detected by the direction sensor 30. The position information about the sampling point may be corrected by mapping the position information received by the GPS receiver 26 onto a road map of the map DB 32.

Figure 3:
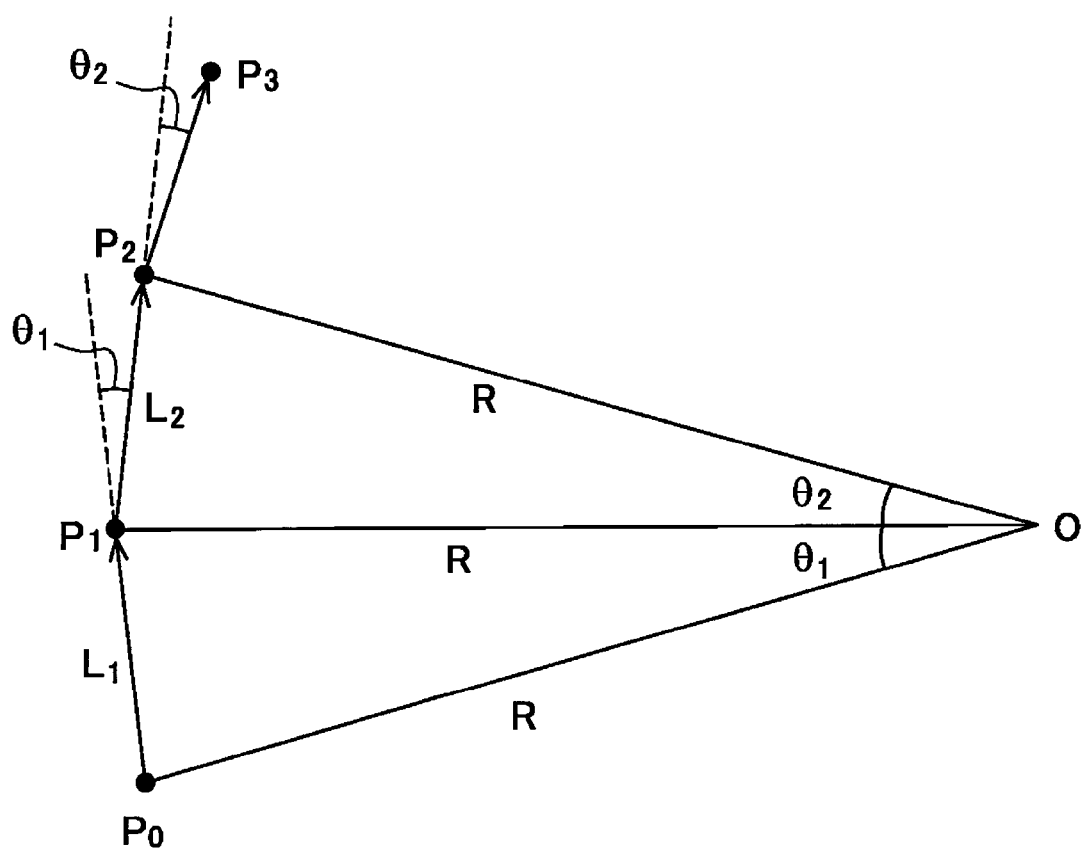
FIG. 3 is an explanatory diagram illustrating a method of computing curvature at a sampling point on a travel route according to the embodiment of the disclosure.

The curvature computation portion 36 uses the following method to compute a value of curvature $\chi$ at each sampling point based on the position information about a sampling point acquired by the travel route storage portion 34. In FIG. 3, points $P_0$ through $P_3$ represent sampling points detected by the vehicle information detection portion 12. In FIG. 3, points $P_0$ through $P_2$ are assumed to be located on a circumference of radius R around reference point 0. Point $P_0$, reference point O, and point $P_1$ form angle $\theta_1$. Point $P_1$, reference point O, and point $P_2$ form angle $\theta_2$.

In this case, point $P_0$, reference point O, and point $P_1$ form an isosceles triangle. The following equation can express distance $L_1$ between point $P_0$ and point $P_1$.

$$L_1 = 2 \cdot R \sin(\theta_1/2) \quad (1)$$

The sampling time interval is short and angle $\theta_1$ is minute. Equation (1) can be approximated as follows.

$$R = (1/\chi) = L_1/\theta_1 \quad (2)$$

A value of $L_1$ can be easily computed based on the vehicle position information acquired by the travel route storage portion 34. In FIG. 3, a line extended from a line segment from point $P_0$ to point $P_1$ and a line segment from point $P_1$ to point $P_2$ form angle $\theta_1$. Angle $\theta_1$ represents an angle change in the travel direction at point $P_1$.

Equation (2) can compute a value of curvature $\chi(=1/R)$ based on distance $L_1$ between the sampling points and the amount of change $\theta_1$ in the vehicle travel angle. This eliminates the need to compute the curvature based on the least-square method for circles and can reduce the processing amount needed to compute curvature $\chi$. This can also eliminate possibilities of variations in computed values of curvature $\chi$.

Point $P_1$, reference point O, and point $P_2$ also form an isosceles triangle. Curvature $\chi(=1/R)$ can be similarly computed based on distance $L_2$ between points $P_1$ and $P_2$ and the amount of change $(=\theta_2)$ in the travel angle at point $P_2$.

The curvature can be also found from the position information about three sampling points as follows. In FIG. 3, coordinates of points $P_0$, $P_1$, and $P_2$ are assumed to be $P_0(x_0,$ $y_0$), $P_1(x_1, y_1)$, and $P_2(x_2, y_2)$, respectively. Radius R and center O (x, y) of the circle passing through these points satisfy the following simultaneous equations.

$$(x_0-x)^2+(y_0-y)^2=R^2$$

$$(x_1-x)^2+(y_1-y)^2=R^2$$

$$(x_2-x)^2+(y_2-y)^2=R^2$$

Solving these simultaneous equations can find x, y, and R and compute curvature (1/R). The curvature computation portion 36 may use this method to find a curvature.

The curvature correction portion 38 corrects the value of curvature χ computed in the curvature computation portion 36. The curvature correction portion 38 allows a road traveled by the vehicle to be classified into the linear section, the circular section, or the clothoid curve section. Suppose that the linearly approximated linear section is directly connected to the circular section maintaining a constant curvature and the driving support is provided according to a curve shape modeled in this manner. In such a case, a vehicle driver needs to manipulate a steering wheel at a stretch up to a steering angle corresponding to the arc curvature at the connection between the linear section and the circular section. For this reason, the clothoid curve section is provided between the linear section approximated as a straight line and the circular section approximated as an arc. The clothoid curve section increases the curvature at a constant rate. This enables the driver to gradually manipulate the steering wheel to pass through the route from the linear section to the curve.

Figure 4:
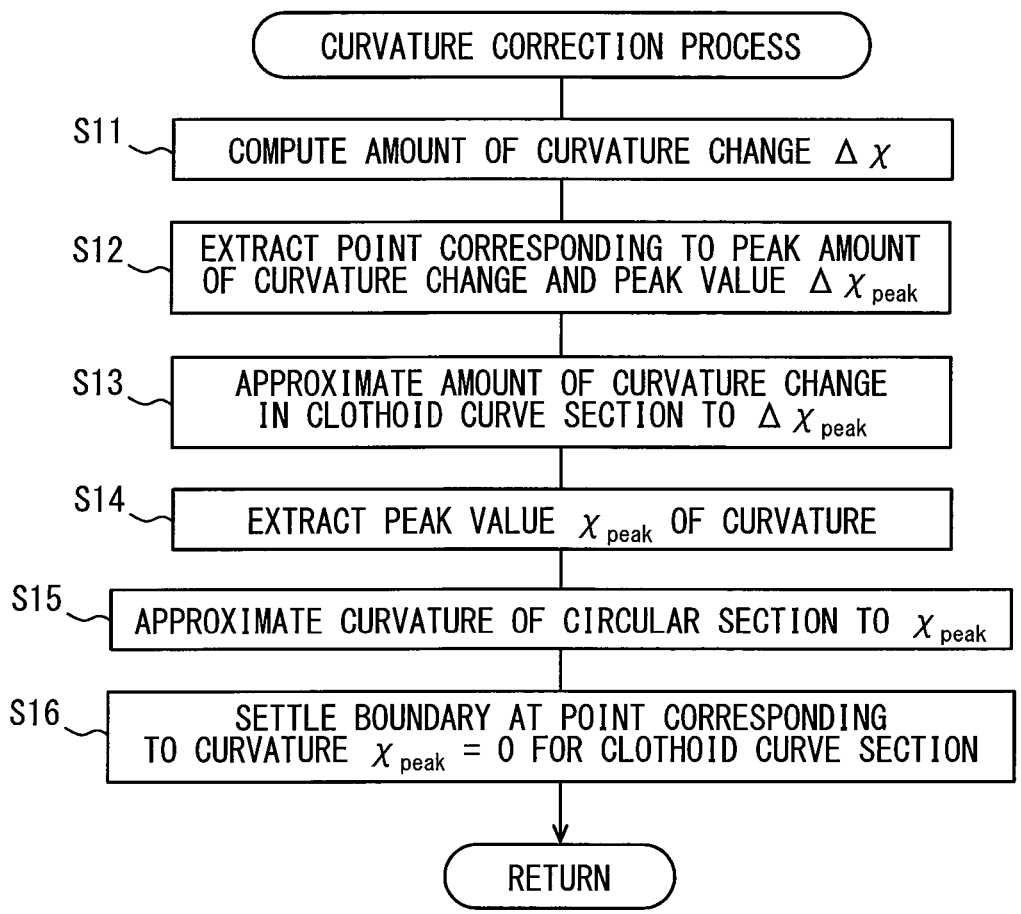
FIG. 4 is a flowchart illustrating a curvature correction process according to the prior art.
Figure 5A:
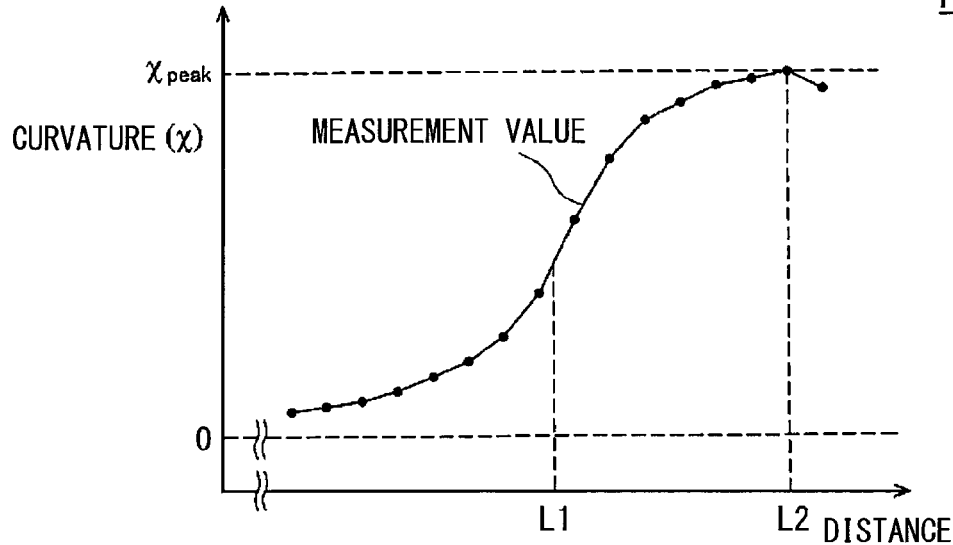
FIG. 5A is a graph illustrating a change in the curvature of a vehicular swept path.
Figure 5B:
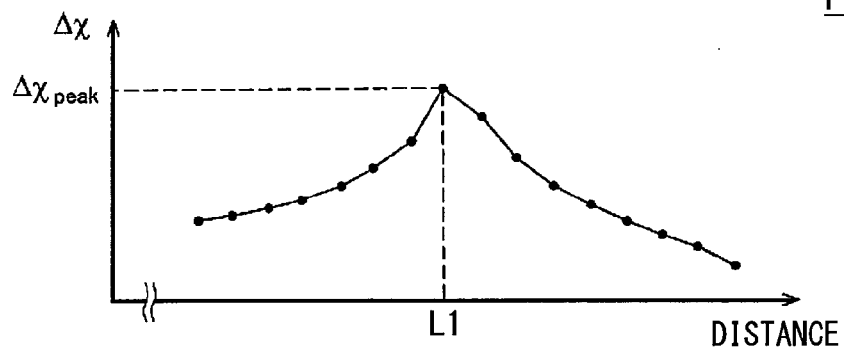
FIG. 5B is a graph illustrating a change in the amount of change in the curvature of a vehicular swept path.
Figure 5C:
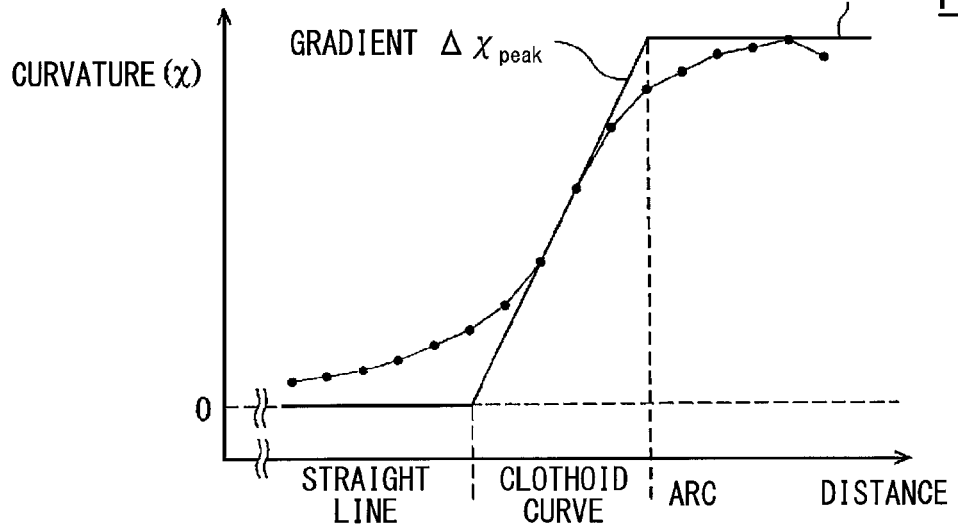
FIG. 5C is a graph illustrating a curvature correction process according to the prior art.

The following describes a curvature correction process according to the prior art with reference to a flowchart in FIG. 4 and explanatory diagrams in FIGS. 5A through 5C. As illustrated in FIG. 5A, values of curvature χ computed by the method often vary smoothly due to factors such as measurement errors in various sensors and cause unclear boundaries among the linear section, the circular section, and the clothoid curve section.

The curvature correction process computes the amount of change Δχ in curvature χ between two adjacent sampling points (S11) to acquire the distribution of amounts of curvature change Δχ as illustrated in FIG. 5B. The curvature correction process extracts peak value $Δχ_{peak}$ of the amount of curvature change Δχ and a sampling point (distance L1 in FIG. 5B) corresponding to the peak value (S12). The curvature correction process approximates value $Δχ_{peak}$ to the amount of change (constant value) in curvature χ in the clothoid curve section (a straight line of gradient $Δχ_{peak}$ in FIG. 5C) (S13). The curvature correction process computes the gradient from FIG. 5A to yield a result in FIG. 5B. The curvature correction process corrects the curvature in FIG. 5B to yield a result in FIG. 5C.

The curvature correction process detects a sampling point (L2) where curvature χ reaches peak value $χ_{peak}$ (hereinafter also referred to as a maximum curvature) (S14). The curvature correction process approximates a region containing the sampling point (L2) to the circular section maintaining constant curvature $χ(χ_{peak})$ (S15).

The curvature correction process settles an intersection point between the straight line of curvature χ in a curve section and the straight line of curvature χ in the clothoid curve section as a boundary (curve entry) between the clothoid curve section and the curve section. The curvature correction process settles an intersection point between the straight line of curvature χ corresponding to the clothoid curve section and curvature χ=0 as a boundary (curve start point) between the linear section and the clothoid curve section (S16). A route traveled by the vehicle can be classified into the linear section, the clothoid curve section, and the circular section.

Figure 6A:
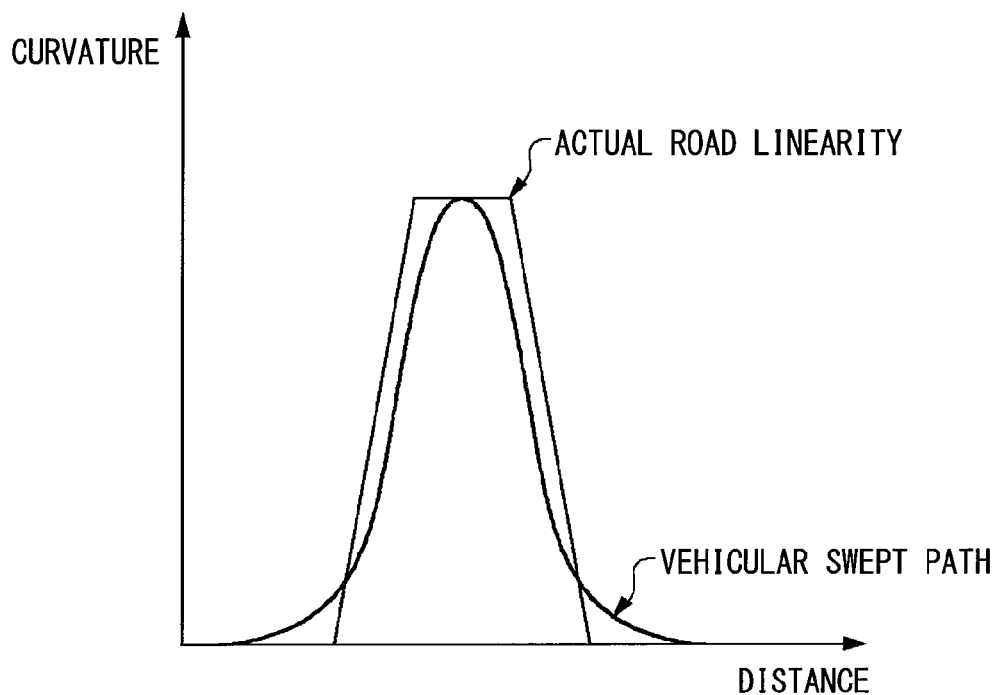
FIG. 6A is a graph illustrating relationship between actual road linearity and a vehicular swept path.
Figure 6B:
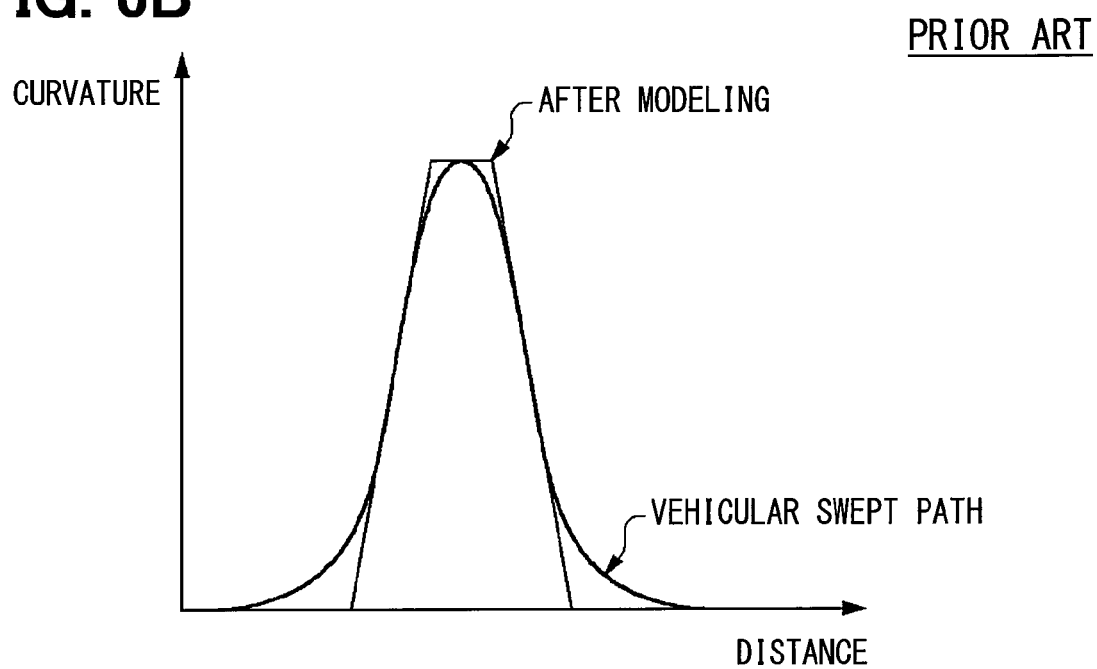
FIG. 6B is a graph illustrating a result of the curvature correction process according to the prior art.

While there has been described the curvature correction process according to the prior art, the following describes the curvature correction portion 38 according to the embodiment in terms of an improvement made to the prior art. FIG. 6A is a graph illustrating relationship between actual road linearity and a vehicular swept path. Performing the curvature correction process according to the prior art on the example in FIG. 6A provides modeled road linearity (curve shape) as illustrated in FIG. 6B. A comparison between FIG. 6A and FIG. 6B indicates that the modeled steady section is shorter than the actual steady section. This is the above-mentioned problem of inability to accurately digitize the steady section length.

An actually traveled vehicular swept path may be collected to indicate vehicular swept path DT as illustrated by the graph in FIG. 6A. When this travel is represented in terms of a curvature change as illustrated in FIG. 6B, there may be available only the curvature change illustrated in FIG. 6B that hardly classifies a vehicular swept path into the linear section, the clothoid curve section, and the steady section.

A curvature change (vehicular swept path) as illustrated in FIG. 6B may be acquired to make it hard to classify a vehicular swept path into the linear section, the clothoid curve section, and the steady section and determine a range of one curve. In such a case, the curvature correction portion 38 according to the embodiment corrects the curvature and determines a curve shape so as to appropriately classify a vehicular swept path into the linear section, the clothoid curve section, and the steady section and solve the problem of making the steady section shorter than the actual distance as illustrated in FIG. 6B. The curvature correction portion 38 appropriately corrects the curvature change to model a curve shape as illustrated in FIG. 6B. The curvature correction portion 28 determines a curve shape by determining the steady section, the linear section, and the clothoid curve section connecting the steady section and the linear section based on the curvature change.

Figure 7:
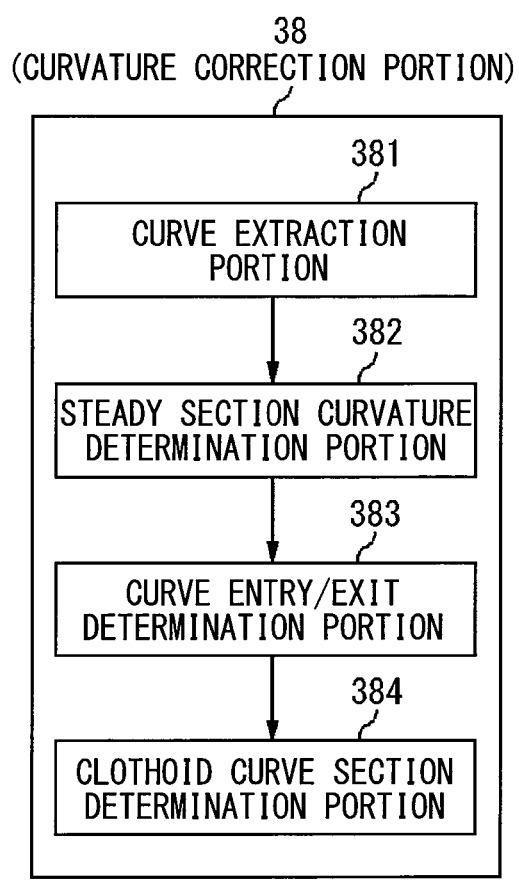
FIG. 7 is a block diagram illustrating a configuration of a curvature correction portion according to the embodiment of the disclosure.

The curvature correction portion 38 is configured as follows. FIG. 7 is a block diagram illustrating a configuration of the curvature correction portion 38. The curvature correction portion 38 includes a curve extraction portion 381, a steady section curvature determination portion 382, a curve entry/exit determination portion 383, and a clothoid curve section determination portion 384. The curve extraction portion 381, the steady section curvature determination portion 382, and the curve entry/exit determination portion 383 determine the steady section. The clothoid curve section determination portion 384 determines the clothoid curve section. As a result, a curve shape is determined. The following describes processes in the components of the curvature correction portion 38.

Extracting a Curve

Figure 8:
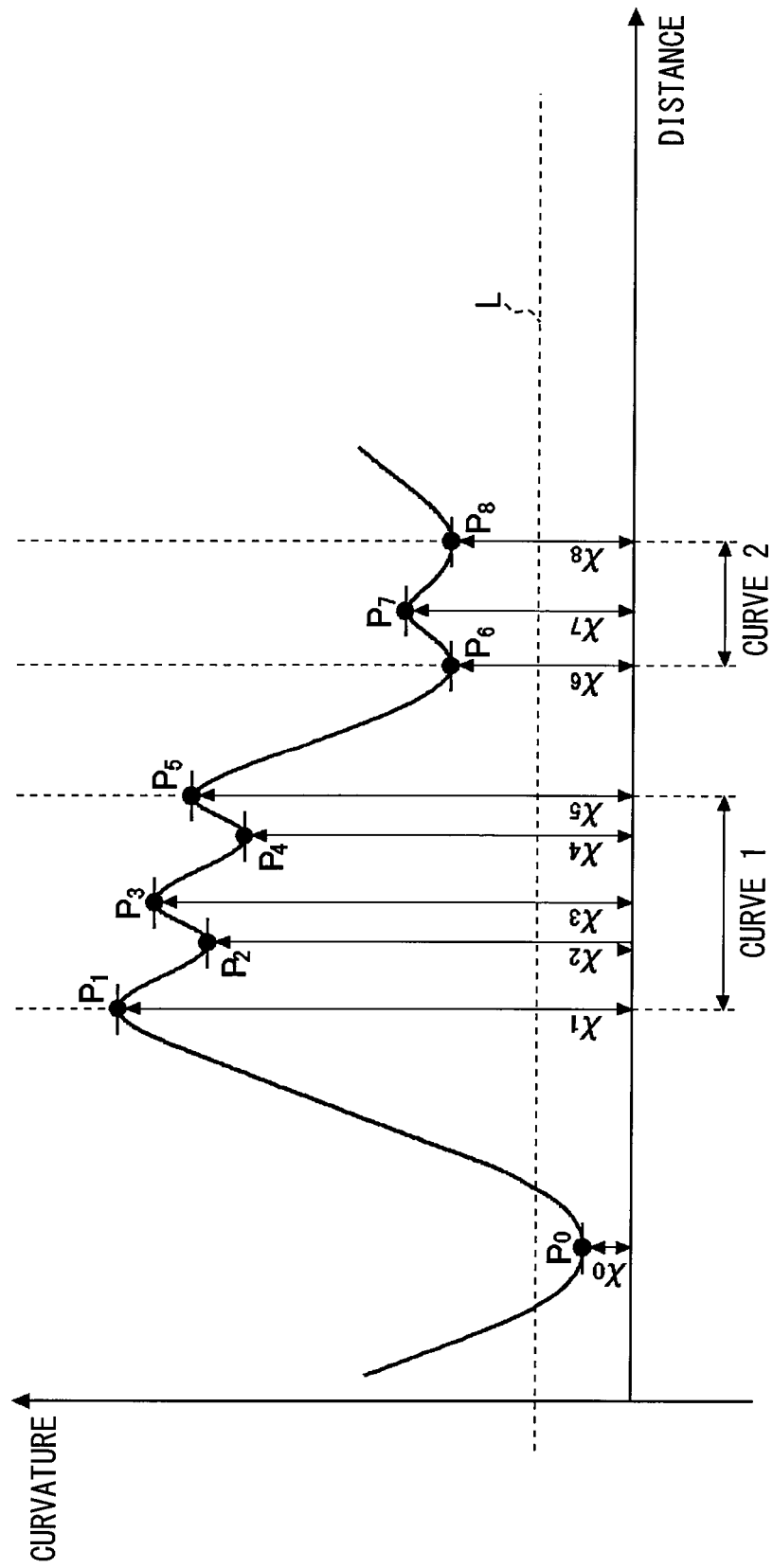
FIG. 8 is a diagram illustrating curve extraction according to the embodiment of the disclosure.

The curve extraction portion 381 extracts a curve based on the curvature at sampling points acquired along a road. FIG. 8 is a graph illustrating a curvature change in the vehicular swept path. The following describes a process in the curve extraction portion 381 using the example in FIG. 8.

The curve extraction portion 381 extracts an extremal point of the curve curvature. The curve extraction portion 381 determines a curve based on acquired extremal points in order along the road. The curve extraction portion 381 determines the curve as part of a straight line when the extremal value of each extremal point approximates to 0 rather than linearity determination level L (L=1/1024 according to the embodiment). The curve extraction portion 381 determines that the extremal point and the immediately preceding extremal point belong to part of the same curve when the extremal value exceeds linearity determination level L and a ratio of the extremal value to an extremal value of the immediately preceding extremal point belongs to a range of specified threshold values (between 1/1.3 and 1.3 according to the embodiment).

With reference to the example in FIG. 8, extremal point $P_0$ is determined to be part of a straight line because extremal value $\chi_0$ of extremal point $P_0$ approximates to 0 lower than linearity determination level L. Extremal point $P_1$ is determined to be a forward end of the curve extraction because the preceding extremal point is determined to be part of the straight line and extremal value $\chi_1$ indicates the curvature exceeding linearity determination level L. Extremal point $P_2$ is determined to be part of the same curve as extremal point $P_1$ containing extremal value $\chi_1$ because the curvature ratio of $\chi_2/\chi_1$ belongs to a range of predetermined threshold values, where extremal value $\chi_2$ corresponds to extremal point $P_2$.

Extremal point $P_3$ is determined to be part of the same curve as extremal value $\chi_2$ because the curvature ratio of $\chi_3/\chi_2$ belongs to a range of predetermined threshold values, where extremal value $\chi_3$ corresponds to extremal point $P_3$. As a result, extremal point $P_1$, extremal point $P_2$, and extremal point $P_3$ are all determined to be parts of the same curve.

Repeating the same process for extremal points $P_4$ and $P_5$ determines that extremal points $P_1$ through $P_5$ are parts of the same curve in the example of FIG. 8. Extremal point $P_6$ is determined to be part of a curve different from extremal points $P_1$ through $P_5$ because the curvature ratio of $\chi_6/\chi_5$ does not belong to a range of predetermined threshold values, where extremal value $\chi_6$ corresponds to extremal point $P_6$. Performing the same curve determination extracts two curves 1 and 2 from extremal points $P_0$ through $P_8$ as illustrated in the example of FIG. 8.

First Modification of the Curve Extraction

Figure 9:
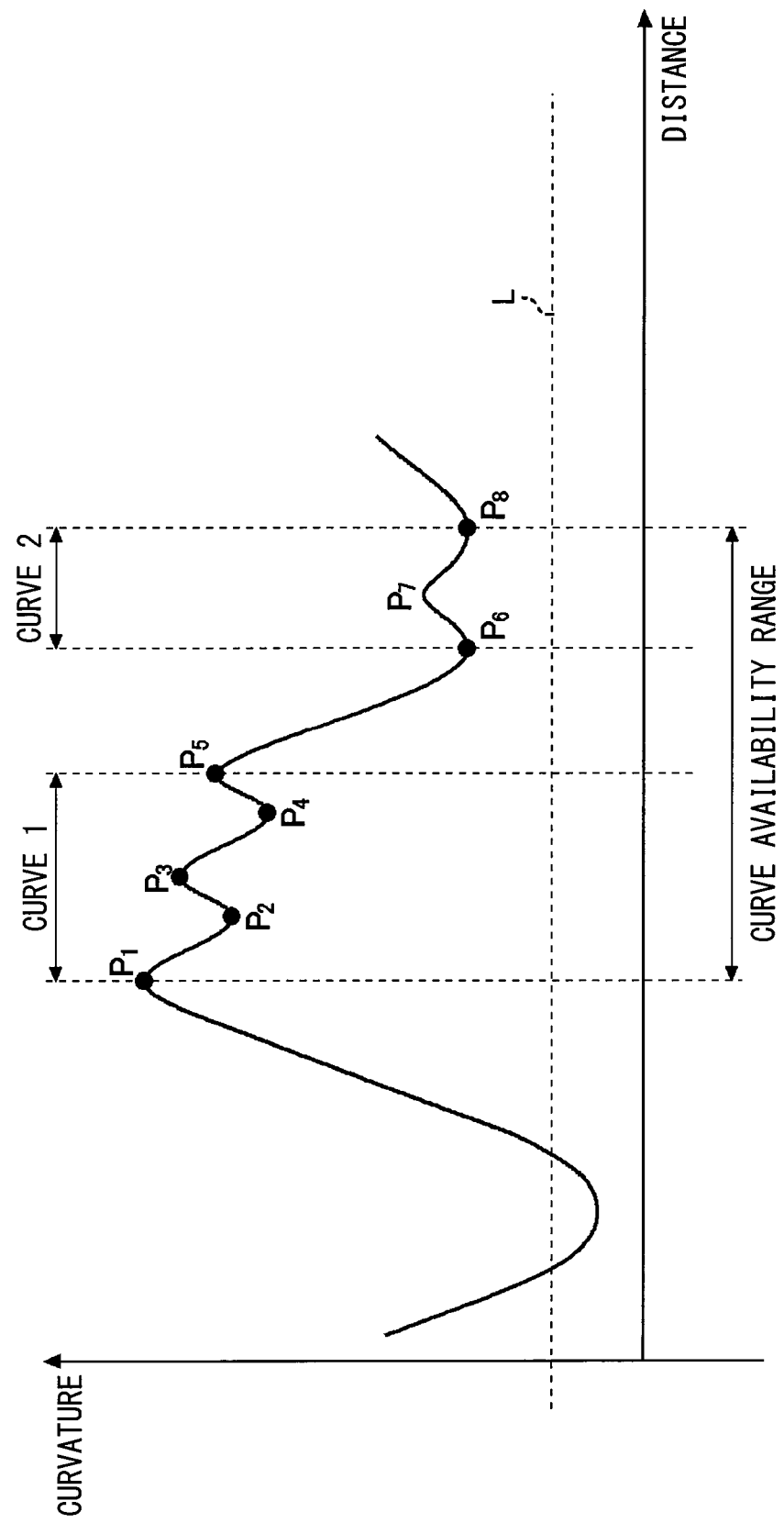
FIG. 9 is a diagram illustrating a first modification of the curve extraction according to the embodiment of the disclosure.

FIG. 9 illustrates the first modification of the curve extraction. The curvature change is the same as the example in FIG. 8. According to the first modification, the curve extraction portion 381 uses a relatively large range of curvature ratios assumed to form the same curve. The above-mentioned example uses the range of curvature ratios from 1/1.3 to 1.3 assumed to form the same curve. The first modification uses the range from ½ to 2, for example. Consequently, the curve extraction portion 381 determines that a curve exists in a range from extremal points $P_1$ to $P_8$ as illustrated in FIG. 9. The curve extraction portion 381 determines the range as a curve availability range.

Figure 10:
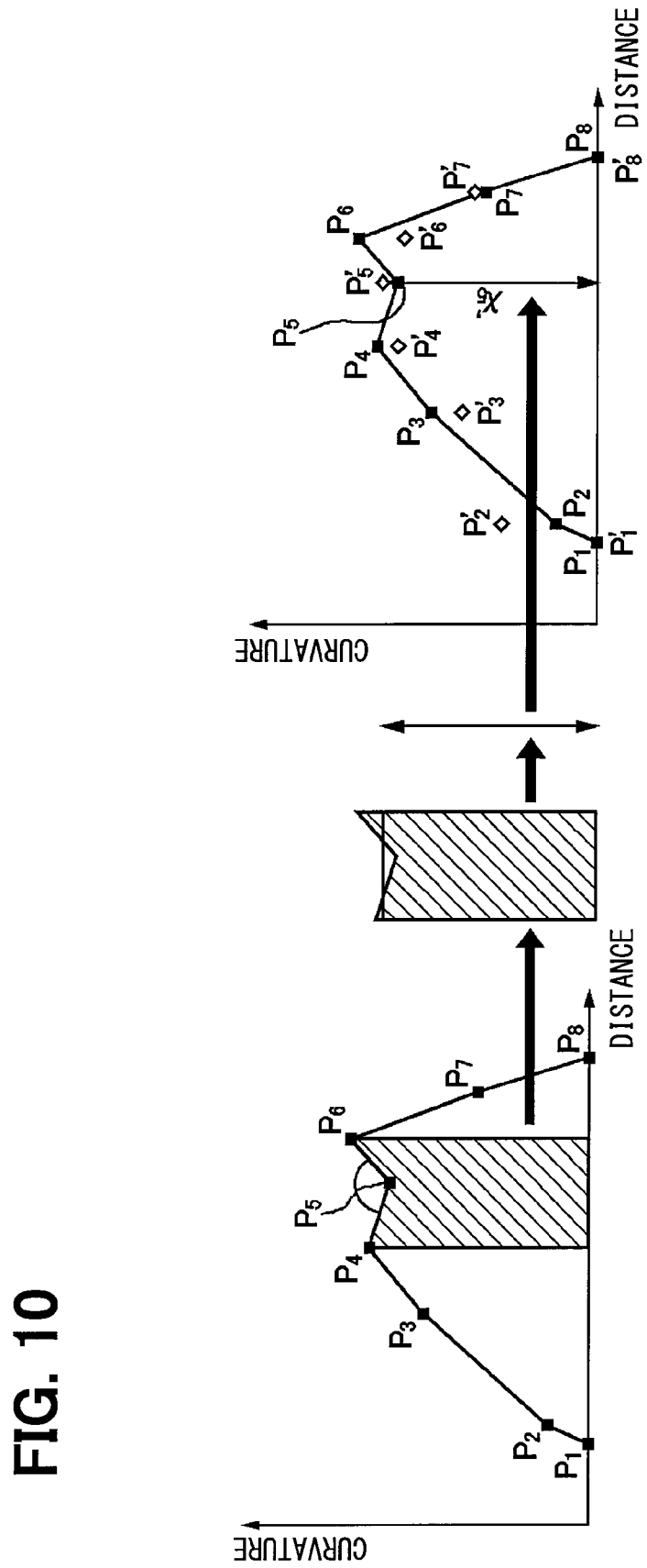
FIG. 10 is a diagram illustrating curvature smoothing in a second modification of the curve extraction according to the embodiment of the disclosure.

The curve extraction portion 381 clusters extremal points $P_1$ to $P_8$ in the curve availability range based on extremal values $\chi_1$ to $\chi_8$. As a result, the range is divided into a cluster of extremal points $P_1$ to $P_5$ (extremal values $\chi_1$ to $\chi_5$) and a cluster of extremal points $P_6$ to $P_8$ (extremal values $\chi_6$ to $\chi_8$). The curve extraction portion 381 determines extremal points $P_1$ to $P_5$ as one curve and extremal points $P_6$ to $P_8$ as another curve. This can also extract a curve from curvature changes in the distance along the road, Second Modification of the Curve Extraction FIG. 10 illustrates the second modification of the curve extraction. According to the modification, the curve extraction portion 381 does not extract extremal points. The curve extraction portion 381 adjusts sampling points to smooth the curvature using an average value of several curvatures before and after each sampling point. The curve extraction portion 381 extracts a curve corresponding to a specified range that covers a difference or a ratio of preceding and subsequent sampling points at a specified distance.

FIG. 10 illustrates a process to adjust the curvature of sampling point $P_5$. The curve extraction portion 381 computes an azimuth difference in the smoothing range containing sampling point $P_5$ when adjusting the curvature of sampling point $P_5$. The example in FIG. 10 defines the smoothing range corresponding to a range of points ($P_4$ and $P_6$) before and after sampling point $P_5$.

The curve extraction curvature adjustment portion 381 provides the smoothing range with a constant curvature so as to maintain the azimuth difference (the area of a shaded region in FIG. 10) in the smoothing range. In FIG. 10, the area of a rectangle equals the area of the shaded region. The curve extraction portion 381 assumes that the top side of the resulting rectangle indicates a value (curvature) of curvature $\chi_5'$ after adjusting sampling point $P_5$.

FIG. 10 illustrates points $P_1'$ through $P_4'$ and $P_6'$ through $P_8'$ after the adjustment resulting from the similar process performed on the other sampling points $P_1$ through $P_4$ and $P_6$ through $P_8$. Points $P_1'$ through $P_8'$ are assumed to include curvatures $\chi_1'$ through $\chi_8'$. The curvature of each point after adjusting the point may use an average curvature for the point including the other nearby points belonging to the smoothing range. The embodiment does not use this method because a distance between the points is irregular.

Figure 11:
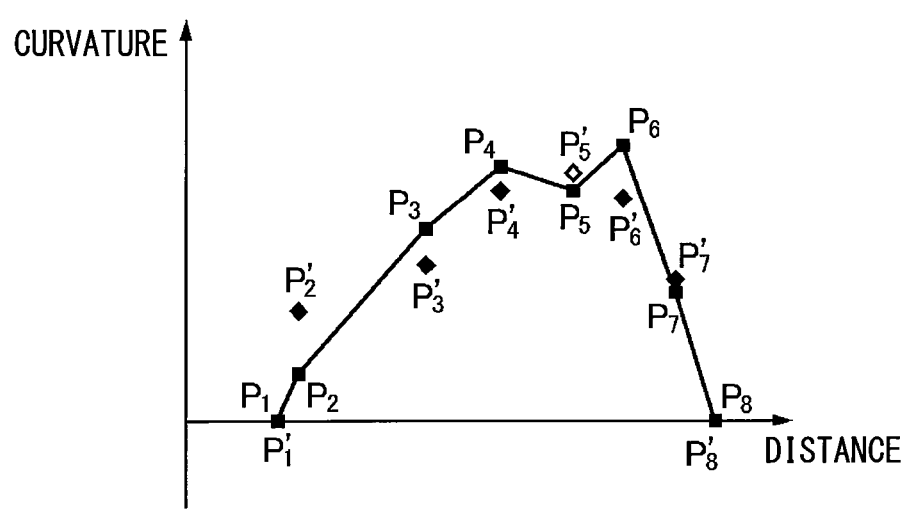
FIG. 11 is a diagram illustrating the second modification of the curve extraction according to the embodiment of the disclosure.

Adjusting curvatures $\chi_1'$ through $\chi_8'$ yields a curvature group whose difference belongs to a specified range. The curve extraction portion 381 determines that this curvature group configures one curve. FIG. 11 illustrates a process to extract a curve from adjusted curvatures $\chi_1'$ through $\chi_8'$ in terms of the example in FIG. 10. The example in FIG. 11 yields a small difference between adjusted curvatures $\chi_4'$ through $\chi_6'$ that are therefore assumed to belong to the same group (to configure the same curve).

A difference between adjusted curvatures $\chi_3'$ and $\chi_4'$ is larger than a specified threshold value. Curvature $\chi_3'$ is therefore assumed to belong to a group different from curvature $\chi_4'$. A difference between adjusted curvatures $\chi_7'$ and $\chi_6'$ is larger than a specified threshold value. Curvature $\chi_6'$ is therefore also assumed to belong to a group different from curvature $\chi_6'$. The curve extraction portion 381 may cluster adjusted curvatures $\chi_1'$ through $\chi_8'$ to find a curvature group that configures a one curve.

Third Modification of the Curve Extraction

Figure 12:
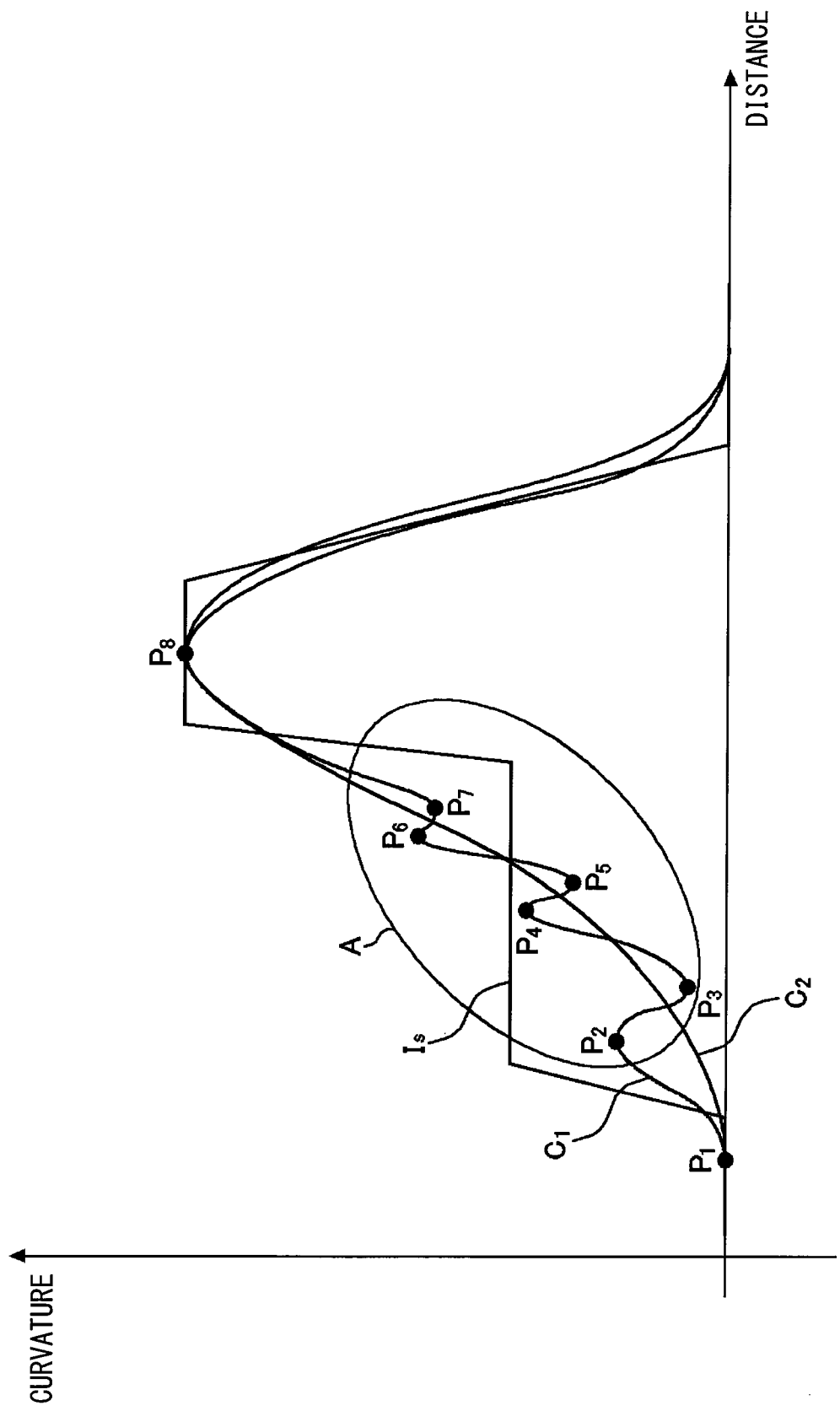
FIG. 12 is a diagram illustrating a third modification of the curve extraction according to the embodiment of the disclosure.

FIG. 12 illustrates the third modification of the curve extraction. Curvature change $C_1$ in FIG. 12 corresponds to the curvature acquired from the sampling points as described above. As seen from a portion marked with A in FIG. 12, extracting an extremal value from curvature change $C_1$ successively extracts extremal points $P_2$ through $P_7$ from the section that must be originally defined as a clothoid curve section. The above-mentioned curve extraction method extracts this portion assumed to configure one curve and may determine the portion as steady section $I_S$.

According to the third modification, the curve extraction portion 381 extracts extremal points from the sampling points and smoothes the extremal points. This adjusts the curvature of the extracted extremal point. The curve extraction portion 381 re-extracts an extremal value from the sampling point whose curvature is adjusted. The curve extraction portion 381 similarly determines whether or not a ratio between the curvature of the extremal point resulting from the re-extraction and the curvature of the preceding extremal point belongs to a specified range. The curve extraction portion 381 determines whether or not the extremal point configures the same curve as the preceding extremal point.

According to the example in FIG. 12, smoothing extremal points $P_1$ through $P_8$ extracts only extremal point $P_8$ as a result of re-extraction. The curve extraction portion 381 extracts only one curve. This prevents a curve from being extracted from a portion of gradually varying the curvature and prevents this portion from being determined as a steady section. The extremal point smoothing can use a moving average between each extremal point and nearby extremal points.

According to the above-mentioned embodiment and modifications, the curve extraction portion 381 evaluates a ratio of an extremal point to the preceding extremal point and determines whether or not the extremal point belongs to the same curve as the preceding extremal point. However, the disclosure is not limited thereto. The curve extraction portion 381 may evaluate a ratio of an extremal point to the succeeding extremal point and determine whether or not the extremal point belongs to the same curve as the succeeding extremal point. The curve extraction portion 381 may evaluate a ratio of an extremal point to the preceding and succeeding extremal points and determine whether or not the extremal point belongs to the same curve as the preceding and succeeding extremal points. The curve extraction portion 381 may smooth curvatures of extremal points before or after or before and after an extremal point and compare the value with the curvature of the extremal point to determine whether or not the extremal point belongs to the same curve as the other extremal point before or after the extremal point or the extremal points before and after the extremal point.

Determining the Steady Section Curvature

The steady section curvature determination portion 382 determines a curvature of each curve extracted by the curve extraction portion 381. The curve curvature determined by the steady section curvature determination portion 382 equals the curvature (steady section curvature $\chi_s$) of the steady section when the steady section is determined.

The steady section curvature determination portion 382 determines whether each curve upward protrudes from the preceding and succeeding curves (to enable a larger curvature than the preceding and succeeding curves), downward protrudes from the same (to enable a smaller curvature than the preceding and succeeding curves), or is located between an upward protruding curve and a downward protruding curve (to enable a larger curvature than one of the preceding and succeeding curves and a smaller curvature than the other).

The steady section curvature determination portion 382 determines steady section curvature $\chi_s$ for an upward protruding curve by finding the local maximal value (maximum value) of the curve. The steady section curvature determination portion 382 determines steady section curvature $\chi_s$ for a downward protruding curve by finding the local minimal value (minimum value) of the curve. The steady section curvature determination portion 382 determines steady section curvature $\chi_s$ for an intermediate curve located between the upward protruding curve and the downward protruding curve by finding an average value of curvatures included in the intermediate curve.

The steady section curvature determination portion 382 may determine steady section curvature $\chi_s$ for an intermediate curve located between the upward protruding curve and the downward protruding curve by finding a median of curvatures included in the intermediate curve. The steady section curvature determination portion 382 may also determine steady section curvature $\chi_s$ for an intermediate curve located between the upward protruding curve and the downward protruding curve by finding an average value or a median of curvatures corresponding to extremal points extracted by the curve extraction portion 381.

The steady section curvature determination portion 382 may determine steady section curvature $\chi_s$ for an upward protruding curve or a downward protruding curve as well as an intermediate curve located between the upward protruding curve and the downward protruding curve finding an average value or a median of curvatures included in the intermediate curve or curvatures corresponding to the extracted extremal points.

Figure 13:
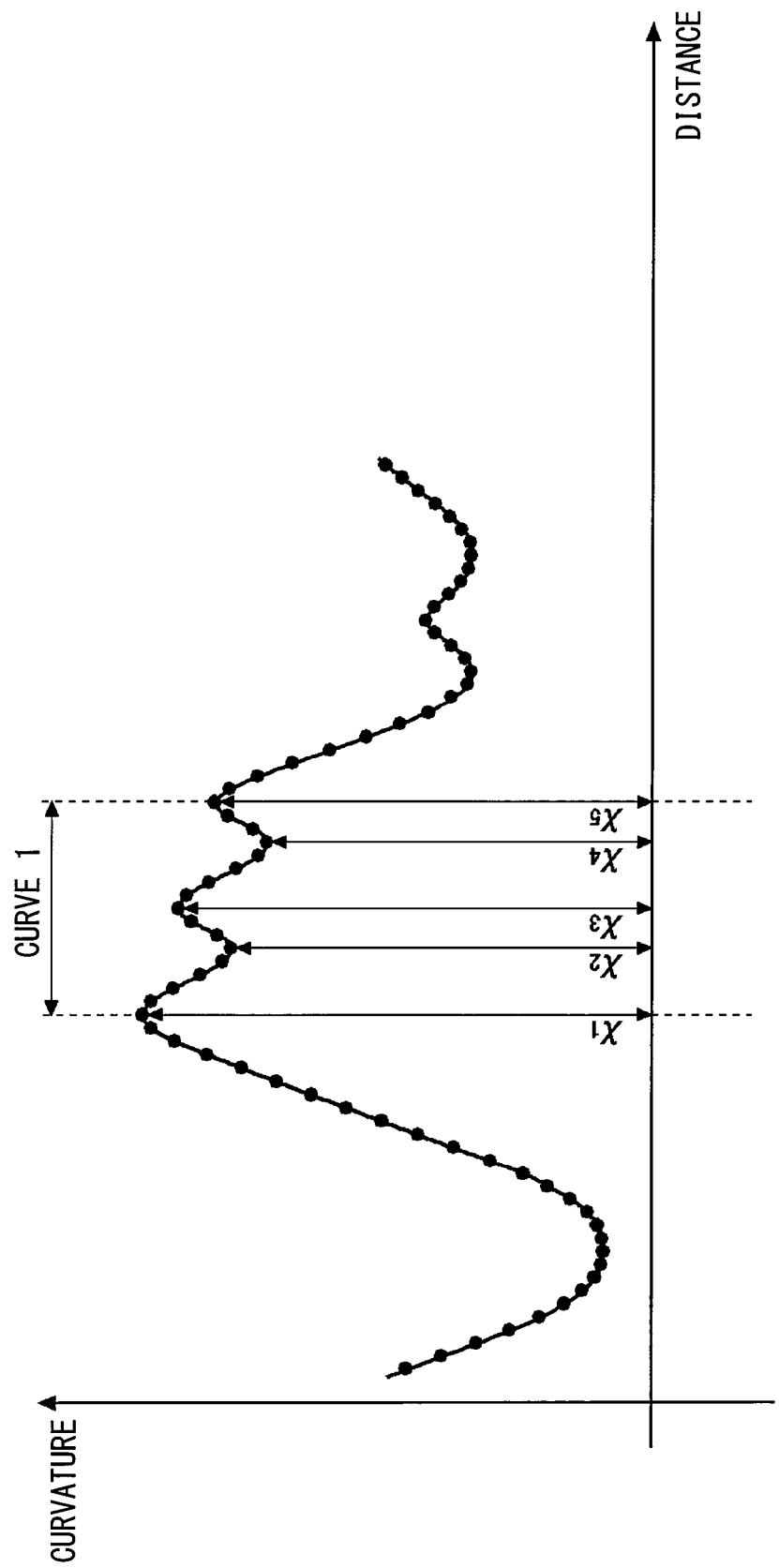
FIG. 13 is a diagram illustrating a method of determining a steady section curvature according to the embodiment of the disclosure.

FIG. 13 is a diagram illustrating a method of finding steady section curvature $\chi_s$ for curve 1 containing extremal points $P_1$ through $P_5$. As illustrated in FIG. 13, curve 1 protrudes upward. Steady section curvature $\chi_s$ for the curve is determined by finding extremal value $\chi_1$ at extremal point $P_1$ as a local maximal value.

The method of determining the steady section curvature is only an example. The steady section curvature determination portion 382 may use other methods to determine steady section curvature $\chi_s$ for each curve. The steady section curvature determination portion 382 may determine steady section curvature $\chi_s$ for an upward or downward protruding curve by finding an average value of curvatures included in the curve. The steady section curvature determination portion 382 may also determine steady section curvature $\chi_s$ for a curve by finding an average of extremal values for curvatures included in the curve.

Determining a Curve Entry/Exit

The curve entry/exit determination portion 383 determines an entry and an exit of each curve extracted by the curve extraction portion 381. A steady section is formed from the curve entry to the curve exit. Determining a curve entry/exit signifies determining a steady section. This determines the steady section length (curve depth).

The curve entry/exit determination portion 383 configures a specified curvature range containing steady section curvature $\chi_s$ of each curve determined by the steady section curvature determination portion 382. According to the embodiment, the curvature range is defined as ±30% from steady section curvature $\chi_s$. The curve entry/exit determination portion 383 determines a curve entry and a curve exit based on the specified curvature range containing steady section curvature $\chi_s$. The following describes three methods.

First Curve Entry/Exit Determination Method

According to the first curve entry/exit determination method, the curve entry/exit determination portion 383 settles a reference point for an upward protruding curve or a downward protruding curve by finding a local maximal or minimal point corresponding to steady section curvature $\chi_s$ for the curve. The curve entry/exit determination portion 383 settles a reference point for an intermediate curve between the upward protruding curve and the downward protruding curve by finding the center of the intermediate curve in the distance direction along the road.

Figure 14:
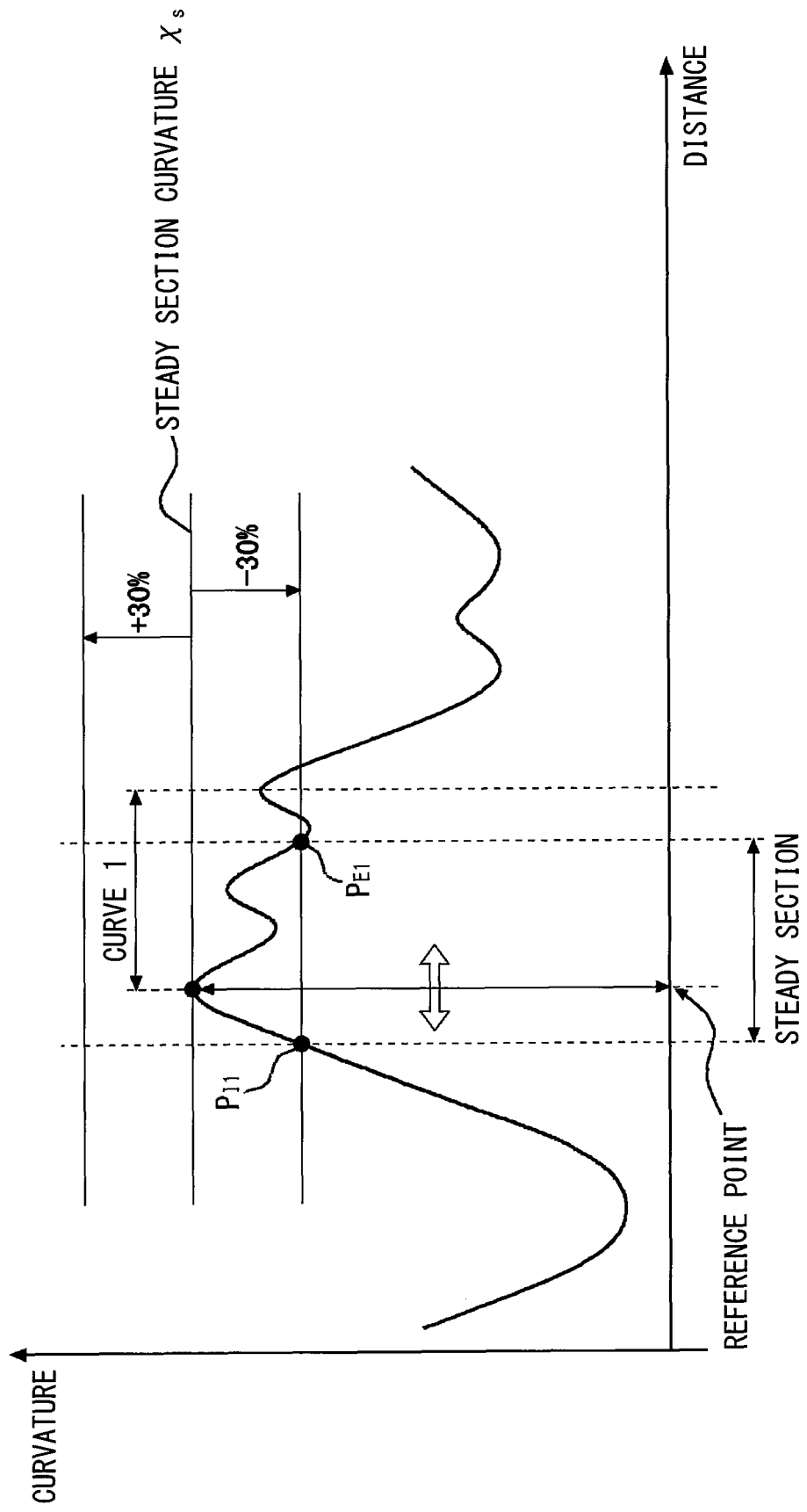
FIG. 14 is a diagram illustrating a first curve entry/exit determination method according to the embodiment of the disclosure.

FIG. 14 is a diagram illustrating the first curve entry/exit determination method. The reference point of curve 1 corresponds to extremal point $P_1$ because extremal value $\chi_1$ at extremal point $P_1$ is assumed to be steady section curvature $\chi_s$ of curve 1. The curve entry/exit determination portion 383 successively determines whether or not a curvature exceeds a specified curvature range, in the forward direction and the backward direction from the reference point. The specified curvature range is first exceeded at point $P_{f1}$ when the curvatures are successively inspected forward from the reference point. The specified curvature range is also first exceeded at point $P_{E1}$ when the curvatures are successively inspected backward from the reference point. The curve entry/exit determination portion 383 determines points $P_{I1}$ and $P_{E1}$ to be a curve entry and a curve exit, respectively, and thereby determines a steady section.

Second Curve Entry/Exit Determination Method

Figure 15:
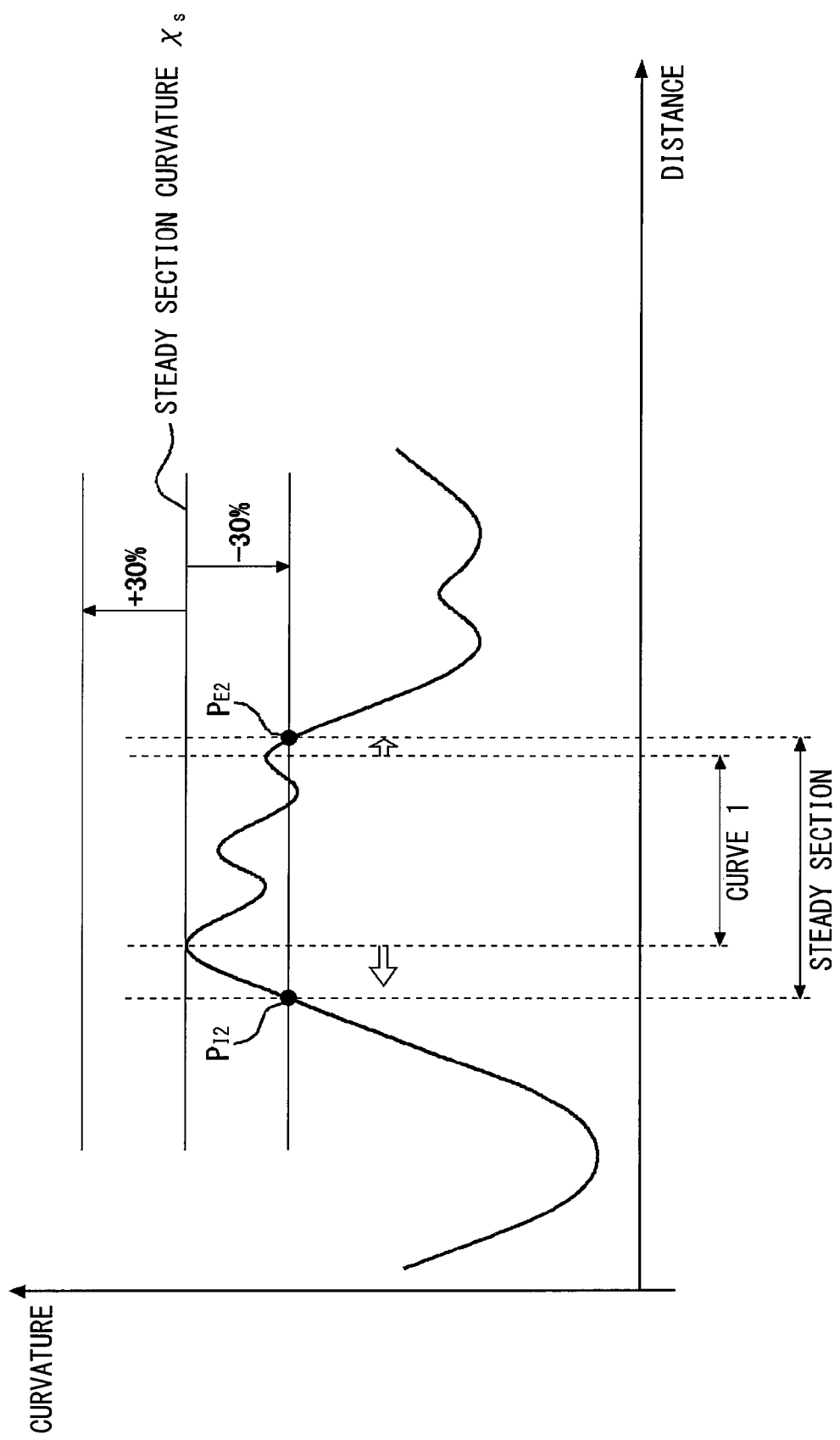
FIG. 15 is a diagram illustrating a second curve entry/exit determination method according to the embodiment of the disclosure.

According to the second curve entry/exit determination method, the curve entry/exit determination portion 383 successively determines whether or not a curvature exceeds a specified curvature range, outward from both ends (boundaries) of an extracted curve. FIG. 15 is a diagram illustrating the second curve entry/exit determination method. The specified curvature range is first exceeded at point $P_{I2}$ when the curvatures are successively inspected forward from the forward end of curve 1. The specified curvature range is also first exceeded at point $P_{E2}$ when the curvatures are successively inspected backward from the backward end of curve 1. The curve entry/exit determination portion 383 determines points $P_{I2}$ and $P_{E2}$ to be a curve entry and a curve exit, respectively, and thereby determines a steady section.

Curve 1 tends to gradually decrease the curvature from the forward end to the backward end as seen from a comparison between the first curve entry/exit determination method (FIG. 14) and the second curve entry/exit determination method (FIG. 15). On this curve, a curve exit determined by the first curve entry/exit determination method may differ from a curve exit determined by the second curve entry/exit determination method.

Third Curve Entry/Exit Determination Method

According to the third curve entry/exit determination method, the curve entry/exit determination portion 383 successively determines whether or not a curvature belongs to a specified curvature range, from outside extremal values at both ends (boundaries) of an extracted curve toward this curve.

Figure 16:
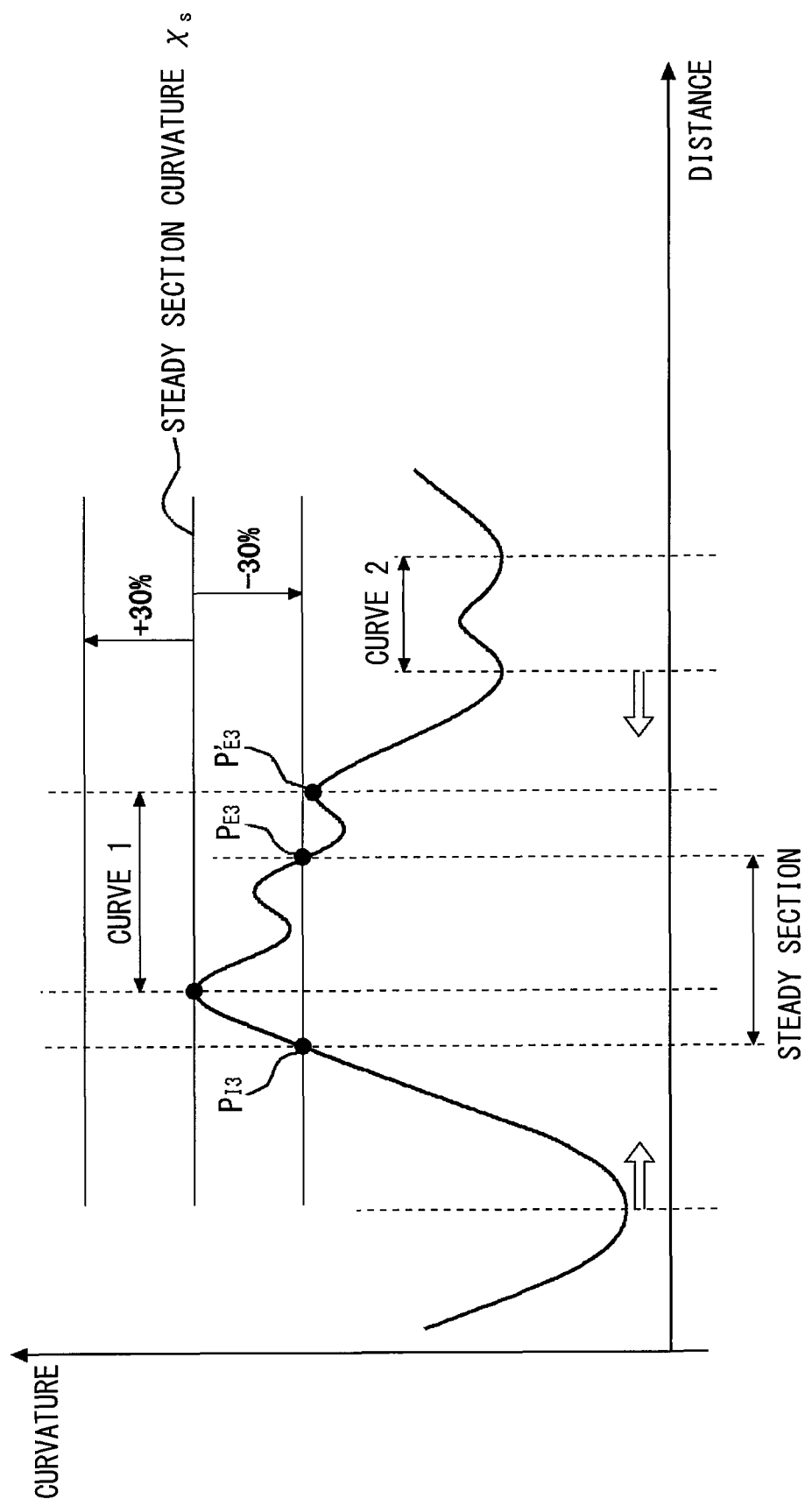
FIG. 16 is a diagram illustrating a third curve entry/exit determination method according to the embodiment of the disclosure.

FIG. 16 is a diagram illustrating the third curve entry/exit determination method. FIG. 16 uses an example of curvature change different from the examples in FIGS. 14 and 15. Point $P_{I3}$ is a first entry to the specified curvature range when curvatures of curve 1 are successively followed backward from an extremal value before the forward end of curve 1. Point $P_{E3}$ is another first entry to the specified curvature range when curvatures of curve 1 are followed forward from an extremal value after the backward end of curve 1. The curve entry/exit determination portion 383 determines points $P_{I3}$ and $P_{E3}$ to be a curve entry and a curve exit, respectively, and thereby determines a steady section.

Suppose the second curve exit determination method is applied to the example of curvature change in FIG. 16. In terms of a curve exit, the curve entry/exit determination portion 383 successively determines whether or not a curvature exceeds the specified curvature range, backward from the backward end of curve 1. However, the curvature at the backward end of curve 1 already exceeds from the specified curvature range. Curve exit $P_{E3}'$ corresponds to the backward end of curve 1 and differs from curve exit $P_{E3}$ determined by the third curve entry/exit determination method.

Determining a Clothoid Curve Section

Similarly to the prior art, the clothoid curve section determination portion 384 computes the amount of curvature change $\Delta\chi$ from curvatures at sampling points found by the curvature computation portion 36. The clothoid curve section determination portion 384 computes peak value $\Delta\chi_{peak}$ for the amount of curvature change $\Delta\chi$ and uses this value $\Delta\chi_{peak}$ to approximate the amount of change (gradient) in curvature $\chi$ in the clothoid curve section. Local maximal peak value $\Delta\chi_{peak}$ is assumed to be the gradient of a clothoid curve section whose curvature gradually increases. Local minimal peak value $\Delta\chi_{peak}$ is assumed to be the gradient of a clothoid curve section whose curvature gradually decreases.

The curve entry/exit determination portion 383 determines the curve entry/exit. The clothoid curve section determination portion 384 determines the clothoid curve section based on the curve entry/exit and the gradient of the clothoid curve section as found above. Specifically, the clothoid curve section determination portion 384 determines a clothoid curve section whose curvature gradually increases so that the backward end corresponds to the curve entry and the gradient corresponds to local maximal peak value $\Delta\chi_{peak}$. The clothoid curve section determination portion 384 determines a clothoid curve section whose curvature gradually decreases so that the forward end corresponds to the curve exit and the gradient corresponds to local minimal peak value $\Delta\chi_{peak}$. A curve start point and a curve end point correspond to intersection points between the clothoid curve section as found above and a straight line of curvature 0.

The curvature correction portion 38 first determines a steady section from sampling points acquired from traveling and then determines a clothoid curve section according to the steady section. The curvature correction portion 38 extracts a curve, then determines its curvature, and configures a curvature range containing the determined curvature. The curvature correction portion 38 determines the steady section corresponding to a section whose curvature is contained in the curvature range. This prevents the steady section from being shortened excessively and can improve the accuracy of curve shape modeling or the accuracy of a curve entry and a curve exit in particular.

According to the embodiment, the clothoid curve section is configured to vary the curvature at a specified ratio and is provided between the linear section and the circular section. However, the disclosure is not limited thereto. The clothoid curve section can be approximated for all types of relaxation curves (such as a spline curve and a Bezier curve).

The curve-shape modeling device according to the embodiment includes the travel route storage portion 34. The curvature computation portion 36 computes a curvature from the vehicular swept path of the vehicle. The curve-shape modeling device according to the disclosure may include a map data storage portion instead of the travel route storage portion 34. The map data storage portion acquires and stores map data containing position information at a sampling point on a route contained in the map. A curve shape may be extracted from the map data stored in the map data storage portion and may be modeled.

The navigation system 10 according to the embodiment includes the map DB 32 that stores map data generated in the map generation portion 22. The map DB 32 is connected to the navigation system 10 via a communication network. Map data may be transmitted to the navigation system 10 according to a request from the navigation system 10.

The disclosure can improve the accuracy of curve shape modeling and is useful for a curve-shape modeling device that models a curve shape from actual travel data or map data.

The disclosure includes the following aspects.

According to a first aspect of the disclosure, a curve-shape modeling device divides several sampling points acquired along a route into a linear section, a relaxation curve section, and a steady section and models a curve shape of the route.

The curve-shape modeling device includes: a curve extraction portion that extracts a curve from the sampling points based on a curvature of the sampling points; a steady section curvature determination portion that determines a curvature of the steady section based on a curvature of a sampling point contained in a curve extracted by the curve extraction portion; and a curve entry/exit determination portion that configures a specified curvature range containing a curvature of the steady section and determines a start point and an end point of the steady section based on the curvature range.

The curve-shape modeling device extracts a curve from the sampling points, determines a curvature (steady section curvature) of the curve, and determines the steady section based on a specified curvature range including the curvature. This can prevent the steady section from being shortened excessively and accurately model a curve shape.

As an alternative, the curve extraction portion may extract a curve using extremal values of curvatures at sampling points. This can efficiently extract a curve.

As an alternative, the curve extraction portion may extract a curve when the sampling points include extremal points corresponding to extremal values assigned to curvatures, a value results from smoothing a curvature of one or more preceding extremal points, a value results from smoothing a curvature of one or more succeeding extremal points, and a ratio of a curvature to the value belongs to a specified range based on a determination that the extremal point forms the same curve as at least one or more of the preceding extremal points or one or more of the succeeding extremal points. This can efficiently extract a curve. Extremal points may gradually increase or decrease in a curve. Even in such a case, a curvature range containing a curvature of the curve is used to finally determine a steady section. The steady section is prevented from being elongated excessively.

As an alternative, the curve extraction portion may extract a curve when the extremal points are smoothed to adjust the curvature, the adjusted curvature includes an extremal point, a value results from smoothing an adjusted curvature of one or more preceding extremal points, a value results from smoothing an adjusted curvature of one or more succeeding extremal points, and a ratio of a curvature to the value belongs to a specified range based on a determination that the extremal point forms the same curve as at least one or more of the preceding extremal points or one or more of the succeeding extremal points. This can reduce a possibility that a curve is extracted from a section originally assumed to be a clothoid curve section and is assumed to correspond to a steady section.

As an alternative, the steady section curvature determination portion may determine a curvature of the steady section by finding an average value or a median of curvatures in a curve extracted by the curve extraction portion. This can easily and appropriately determine a curvature of the steady section.

As an alternative, the steady section curvature determination portion may determine a curvature of the steady section by finding an average value or a median of extremal values for curvatures in a curve extracted by the curve extraction portion. This can also easily and appropriately determine a curvature of the steady section.

As an alternative, the steady section curvature determination portion determines whether a curve extracted by the curve extraction portion protrudes upward or downward. The steady section curvature determination portion determines that a curvature of the steady section corresponds to a local maximal value for a curvature in an upward protruding curve. The steady section curvature determination portion determines that a curvature of the steady section corresponds to a local minimal value for a curvature in a downward protruding curve. This can easily and appropriately determine a curvature of the steady section.

As an alternative, the steady section curvature determination portion may determine that a curvature of the steady section corresponds to an average value or a median for a curvature in a curve that is extracted by the curve extraction portion and is located between an upward protruding curve and a downward protruding curve. This can easily and appropriately determine a curvature of a stepped steady section.

As an alternative, the steady section curvature determination portion may determine that a curvature of the steady section corresponds to an average value or a median for extremal values of curvatures in a curve that is extracted by the curve extraction portion and is located between an upward protruding curve and a downward protruding curve. This can also easily and appropriately determine a curvature of a stepped steady section.

As an alternative, the curve entry/exit determination portion may determine whether a curvature at each point exceeds the curvature range, forward and backward along the route sequentially from a given point in the curve. The curve entry/exit determination portion may determine points where a curvature exceeds the curvature range to be a start point and an end point of the steady section. This can appropriately model a quadratic curve shape.

As an alternative, the given point in the curve may include a local maximal curvature or a local minimal curvature in a curve. This can appropriately model a quadratic curve shape because the given point is positioned approximately at the center of the quadratic curve.

As an alternative, the curve entry/exit determination portion may determine whether a curvature at each point exceeds the curvature range, forward and backward along the route sequentially from preceding and succeeding boundaries of a curve extracted by the curve extraction portion. The curve entry/exit determination portion may determine points where a curvature exceeds the curvature range to be a start point and an end point of the steady section. This can ensure a sufficiently wide steady section.

As an alternative, the curve entry/exit determination portion may determine whether a curvature at each point belongs to the curvature range, along the route sequentially from outside of a curve extracted by the curve extraction portion in a direction toward the curve. The curve entry/exit determination portion may determine points where a curvature enters the curvature range to be a start point and an end point of the steady section. This can prevent the steady section from being too wide.

As an alternative, the curve-shape modeling device may further include a relaxation curve section determination portion that determines the relaxation curve section according to a start point and an end point of the steady section determined by the curve entry/exit determination portion. This can prevent the steady section from being narrowed due to determination of a relaxation curve section because the steady section is determined and then the relaxation curve section is determined.

According to a second aspect of the disclosure, a vehicle information processing system processes information about a vehicle based on detected vehicle information and a route modeled by the curve-shape modeling device described in the first aspect of the disclosure.

The vehicle information processing system can perform information processing such as driving support and driving control based on an accurately modeled curve shape.

According to a third aspect of the disclosure, a curve-shape modeling method classifies several sampling points acquired along a route into a linear section, a relaxation curve section, and a steady section to model a curve shape of the route. The method includes: extracting a curve from the sampling points based on curvatures at the sampling points; determining a curvature of the steady section based on a curvature at a sampling point contained in an extracted curve; and configuring a specified curvature range containing a curvature of the steady section and determining a start point and an end point of the steady section based on the curvature range.

The curve-shape modeling method extracts a curve from the sampling points, determines a curvature (steady section curvature) of the curve, and determines the steady section based on a specified curvature range including the curvature. This can prevent the steady section from being shortened excessively and accurately model a curve shape.

According to a fourth aspect of the disclosure, a curve-shape modeling program allows a computer to perform a curve-shape modeling method of classifying several sampling points acquired along a route into a linear section, a relaxation curve section, and a steady section to model a curve shape of the route. The method includes: extracting a curve from the sampling points based on curvatures at the sampling points; determining a curvature of the steady section based on a curvature at a sampling point contained in a curve extracted by the curve extraction step; and configuring a specified curvature range containing a curvature of the steady section and determining a start point and an end point of the steady section based on the curvature range.

The curve-shape modeling program extracts a curve from the sampling points, determines a curvature (steady section curvature) of the curve, and determines the steady section based on a specified curvature range including the curvature. This can prevent the steady section from being shortened excessively and accurately model a curve shape.

It is noted that a flowchart or the processing of the flowchart in the present application includes sections (also referred to as steps), each of which is represented, for instance, as S100. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A curve-shape modeling device that divides a plurality of sampling points acquired along a route into a linear section, a relaxation curve section and a steady section, and models a curve shape of the route, the curve-shape modeling device comprising:

a curve extractor configured to extract a curve from the sampling points based on a curvature of the sampling points;

a steady section curvature determiner configured to determine a curvature of the steady section based on a curvature of sampling points included in the curve extracted by the curve extractor; and a curve entry and exit determiner configured to set a predetermined curvature range including the curvature of the steady section, and determines a start point and an end point of the steady section based on the curvature range, wherein the curve extractor extracts the curve using an extremal value of the curvature of the sampling points, and wherein the curve extractor extracts the curve when the curve extractor determines that one of extremal points having the extremal values assigned to the curvature of the sampling points provides a same curve as at least one of one or more preceding extremal points and one or more succeeding extremal points in a case where a ratio between the curvature of the one of extremal points and a value obtained by smoothing the curvature of the one or more preceding extremal points or a value obtained by smoothing the curvature of the one or more succeeding extremal points is disposed within a predetermined range.

2. The curve-shape modeling device according to claim 1, wherein the curve extractor adjusts the curvature by smoothing the extremal points, and wherein the curve extractor extracts the curve when the curve extractor determines that the one of extremal points having the extremal values assigned to an adjusted curvature of the sampling points provides a same curve as at least one of one or more preceding extremal points and one or more succeeding extremal points in a case where a ratio between the adjusted curvature of the one of extremal points and a value obtained by smoothing the adjusted curvature of the one or more preceding extremal points or a value obtained by smoothing the adjusted curvature of the one or more succeeding extremal points is disposed within the predetermined range.

3. The curve-shape modeling device according to claim 1, wherein the steady section curvature determiner is configured to determine an average value or a median of curvatures in the curve extracted by the curve extractor as the curvature of the steady section.

4. The curve-shape modeling device according to claim 1, wherein the steady section curvature determiner is configured to determine an average value or a median of extremal values for curvatures in the curve extracted by the curve extractor.

5. The curve-shape modeling device according to claim 1, wherein the steady section curvature determiner is configured to determine whether the curve extracted by the curve extractor protrudes upward or downward, wherein the steady section curvature determiner is configured to determine a local maximal value of the curvature in the curve as the curvature of the steady section when the curve protrudes upward, and wherein the steady section curvature determiner is configured to determine a local minimal value of the curvature in the curve as the curvature of the steady section when the curve protrudes downward.

6. The curve-shape modeling device according to claim 5, wherein the steady section curvature determiner is configured to determine an average value or a median of curvatures in the curve extracted by the curve extractor as the curvature of the steady section when the curve has a form between an upward protruding curve and a downward protruding curve.

7. The curve-shape modeling device according to claim 5, wherein the steady section curvature determiner is configured to determine an average value or a median of extremal values for curvatures in the curve extracted by the curve extractor as the curvature of the steady section when the curve has a form between an upward protruding curve and a downward protruding curve.

8. The curve-shape modeling device according to claim 1, wherein the curve entry and exit determiner is configured to sequentially determine whether a curvature at each sampling point, which is arranged forward or backward from a predetermined sampling point in the curve along the route, exceeds the curvature range, and wherein the curve entry and exit determiner is configured to determine a sampling point where the curvature exceeds the curvature range to be the start point or the end point of the steady section.

9. The curve-shape modeling device according to claim 8, wherein the predetermined sampling point in the curve has a local maximal curvature or a local minimal curvature in the curve.

10. The curve-shape modeling device according to claim 1,
wherein the curve entry and exit determiner is configured to sequentially determine whether a curvature at each sampling point, which is arranged forward or backward from a preceding boundary or a succeeding boundary of the curve extracted by the curve extractor along the route, exceeds the curvature range, and wherein the curve entry and exit determiner is configured to determine a sampling point where the curvature exceeds the curvature range to be the start point or the end point of the steady section.

11. The curve-shape modeling device according to claim 1,
wherein the curve entry and exit determiner is configured to sequentially determine whether a curvature at each sampling point, which is arranged in a direction from an outside of the curve extracted by the curve extractor toward the curve along the route, is disposed within the curvature range, and wherein the curve entry and exit determiner is configured to determine a sampling point where the curvature is disposed within the curvature range to be the start point or the end point of the steady section.

12. The curve-shape modeling device according to claim 1, further comprising:
a relaxation curve section determiner configured to determine a relaxation curve section according to the start point and the end point of the steady section determined by the curve entry and exit determiner.

13. A vehicle information processing system that processes information about a vehicle based on detected vehicle information and a route modeled by the curve-shape modeling device according to claim 1.

14. A curve-shape modeling method of classifying a plurality of sampling points acquired along a route into a linear section, a relaxation curve section and a steady section to model a curve shape of the route, executed on a computer, the method comprising:
extracting a curve from the sampling points based on a curvature at the sampling points;
determining a curvature of the steady section based on a curvature at the sampling points included in an extracted curve; and
setting a predetermined curvature range including the curvature of the steady section, and determining a start point and an end point of the steady section based on the curvature range,
wherein the extracting of the curve includes: extracting the curve using an extremal value of the curvature of the sampling points; and
wherein the extracting of the curve is performed when it is determined in the determining of the curvature of the steady section that one of extremal points having the extremal values assigned to the curvature of the sampling points provides a same curve as at least one of one or more preceding extremal points and one or more succeeding extremal points in a case where a ratio between the curvature of the one of extremal points and a value obtained by smoothing the curvature of the one or more preceding extremal points or a value obtained by smoothing the curvature of the one or more succeeding extremal points is disposed within a predetermined range.

15. A non-transitory tangible computer readable medium comprising instructions being executed by a computer, the instructions including a computer-implemented curve-shape modeling method of classifying a plurality of sampling points acquired along a route into a linear section, a relaxation curve section and a steady section to model a curve shape of the route, the method comprising:
extracting a curve from the sampling points based on a curvature at the sampling points;
determining a curvature of the steady section based on a curvature at the sampling points included in a curve extracted at the extracting of the curve; and
setting a predetermined curvature range including the curvature of the steady section, and determining a start point and an end point of the steady section based on the curvature range,
wherein the extracting of the curve includes: extracting the curve using an extremal value of the curvature of the sampling points; and
wherein the extracting of the curve is performed when it is determined in the determining of the curvature of the steady section that one of extremal points having the extremal values assigned to the curvature of the sampling points provides a same curve as at least one of one or more preceding extremal points and one or more succeeding extremal points in a case where a ratio between the curvature of the one of extremal points and a value obtained by smoothing the curvature of the one or more preceding extremal points or a value obtained by smoothing the curvature of the one or more succeeding extremal points is disposed within a predetermined range.

* * * * *